US012573679B2

(12) United States Patent
Oh

(10) Patent No.: US 12,573,679 B2
(45) Date of Patent: Mar. 10, 2026

(54) METHOD, APPARATUS, AND SYSTEM FOR LITHIUM ION BATTERY RECYCLING

(71) Applicant: Blue Whale Materials LLC, Washington, DC (US)

(72) Inventor: Minjae Oh, Washington, DC (US)

(73) Assignee: BLUE WHALE MATERIALS LLC, DC (US)

( * ) Notice: Subject to any disclaimer, the term of this patent is extended or adjusted under 35 U.S.C. 154(b) by 0 days.

(21) Appl. No.: 19/206,992

(22) Filed: May 13, 2025

(65) Prior Publication Data

US 2025/0337035 A1 Oct. 30, 2025

Related U.S. Application Data

(62) Division of application No. 17/599,318, filed as application No. PCT/US2021/046329 on Aug. 17, 2021, now Pat. No. 12,334,522.

(Continued)

(51) Int. Cl.
| | |
|---|---|
| *H01M 10/54* | (2006.01) |
| *B03B 9/06* | (2006.01) |
| *B03C 1/00* | (2006.01) |
| *B22F 1/00* | (2022.01) |
| *B22F 1/12* | (2022.01) |

(Continued)

(52) U.S. Cl.
CPC .............. *H01M 10/54* (2013.01); *B03B 9/06* (2013.01); *B03C 1/00* (2013.01); *B22F 1/09* (2022.01); *B22F 1/12* (2022.01); *B22F 9/04* (2013.01); *C22B 7/005* (2013.01); *B03B 2009/066* (2013.01); *B03C 2201/20* (2013.01);

(Continued)

(58) Field of Classification Search
CPC .... H01M 10/54; B03B 9/06; B03B 2009/066; B03C 1/00; B03C 2201/20; B22F 1/09; B22F 1/12; B22F 9/04; B22F 2301/054; B22F 2301/15; B22F 2302/40; C22B 7/005
USPC .......................... 266/137, 161; 75/430, 255
See application file for complete search history.

(56) References Cited

U.S. PATENT DOCUMENTS 7,192,564 B2 * 3/2007 Cardarelli ............... H01M 6/52
75/693
9,156,038 B2 10/2015 Ellis et al.
(Continued)

FOREIGN PATENT DOCUMENTS

CN 101984516 B 8/2012
CN 103730704 * 4/2014 ........... H01M 10/54
(Continued)

OTHER PUBLICATIONS

Communication for related European Application No. 21858977.8-1103, dated Feb. 17, 2025, 21 pages.
(Continued)

*Primary Examiner* — Jessee R Roe
*Assistant Examiner* — Michael Aboagye
(74) *Attorney, Agent, or Firm* — DITTHAVONG, STEINER & MLOTKOWSKI

(57) ABSTRACT

The present application provides a system and method for discharging and processing of lithium ion batteries to extract one or more metals. The extracted metals are in a powder form that can be reused at second stage processing facilities. The extracted metal powder can include lithium and at least one of cobalt, nickel, manganese, and carbon.

11 Claims, 26 Drawing Sheets

Related U.S. Application Data

(60) Provisional application No. 63/066,629, filed on Aug. 17, 2020.

(51) Int. Cl.
| | |
|---|---|
| B22F 9/04 | (2006.01) |
| C22B 7/00 | (2006.01) |

(52) U.S. Cl.
CPC ..... *B22F 2301/054* (2013.01); *B22F 2301/15* (2013.01); *B22F 2302/40* (2013.01)

(56) References Cited

U.S. PATENT DOCUMENTS

| | | | |
|---|---|---|---|
| 10,919,046 B2 | 2/2021 | Kochhar et al. | |
| 10,960,403 B2 | 3/2021 | Kochhar et al. | |
| 11,077,452 B2 | 8/2021 | Kochhar et al. | |
| 11,088,406 B2 * | 8/2021 | Muraoka | H01M 10/54 |
| 11,135,595 B2 | 10/2021 | Kochhar et al. | |
| 11,273,453 B2 * | 3/2022 | Kochhar | B02C 23/36 |
| 12,334,522 B2 * | 6/2025 | Oh | B22F 1/09 |
| 2009/0229413 A1 | 9/2009 | Kakuta et al. | |
| 2013/0312254 A1 * | 11/2013 | Kim | H01M 4/525 423/49 |
| 2019/0039075 A1 * | 2/2019 | Ellis | B03C 1/32 |
| 2019/0386354 A1 | 12/2019 | Muraoka et al. | |

FOREIGN PATENT DOCUMENTS

| | | | | |
|---|---|---|---|---|
| CN | 107017443 A | 8/2017 | | |
| CN | 1070177443 | * 8/2017 | | H01M 10/54 |
| CN | 108110356 A | 6/2018 | | |
| CN | 109411764 A | 3/2019 | | |
| CN | 110714122 A | 1/2020 | | |
| JP | 2020-522617 A | 7/2020 | | |
| KR | 100637680 B1 | 10/2006 | | |
| WO | 2018218358 A | 12/2018 | | |
| WO | 2020109045 A1 | 6/2020 | | |

OTHER PUBLICATIONS

Okamoto et al., "The current situation for recycling of lithium ion batteries", The 6th International Symposium on East Asian Resources Recycling Technology, Oct. 1, 2001, 5 pages.

Mossali et al., "Lithium-ion batteries towards circular economy: A literature review of opportunities and issues of recycling treatments", Journal of Environmental Management, Jun. 2020, 12 pages.

Sommerville et al., "A review of physical processes used in the safe recycling of lithium ion batteries" Jul. 2020, 42 pages.

Diaz et al., "Degradation mechanism of nickel-cobalt-aluminum (NCA) cathode material from spent lithium-ion batteries in microwave-assisted pyrolysis", Metals 8.8, (2018): 565. (Year: 2018).

Notification of Transmittal of the International Search Report and the Written Opinion of the International Searching Authority, or the Declaration; International Search Report; and Written Opinion for related International Application No. PCT/US21/46329, dated Nov. 22, 2021, 10 pages.

Friedrich et al., "State of research on Li-Ion battery recycling", Handbook of Clean Energy Systems, Mar. 30, 2017, pp. 9, 12, & 14.

Arambarri et al., "Lithium ion car batteries: Present analysis and future predictions", Research Article, Environmental Engineering Research 2019; 24(4), Published Online: Feb. 15, 2019, pp. 699-710.

Hanisch et al., abstract and cited portion of "Recycling of Lithium-Ion Batteries", Jul. 16, 2015, In book: Handbook of Clean Energy Systems—vol. 5, Energy Storage, Edition: 2015, Chapter: 27, 2 pages.

* cited by examiner

601

801

901

Sorting — 1001

Plastic Package Removal — 1003

Pre-shredding and into Water — 1004

Discharging Kiln — 1005

Rotary Kiln and Cooling Retort — 1007

Shredding and Separating — 1009

1401

1601

2001

Sorting

2101

Plastic Package Removal

2103

Continuous Discharging Kiln

2105

Shredding and Separating

2107

2201

METHOD, APPARATUS, AND SYSTEM FOR LITHIUM ION BATTERY RECYCLING

RELATED APPLICATIONS

The present application is divisional application of U.S. patent application Ser. No. 17/599,318, filed on Sep. 28, 2021, which is a 35 U.S.C. § 371 application of International Application No. PCT/US21/46329, filed on Aug. 17, 2021, and which claims the benefit of priority to U.S. Provisional Application No. 63/066,629, filed on Aug. 17, 2020, the contents of which are incorporated herein by reference in their entirety.

BACKGROUND

The production and usage of lithium-ion (Li-ion) batteries continues to increase for portable consumer electronic devices and electric vehicles (EV). They stand apart from other battery types due to their higher charge density which results in a longer battery life, albeit at a higher cost. Although contents of Li-ion batteries are less toxic than most other battery types, lithium metal is a highly reactive element. Li-ion batteries have a flammable electrolyte and pressurized contents and any externally applied pressure or heat, especially during the summer, can cause Li-ion batteries to spark and start fires. Commercially useful quantities of cobalt and nickel metal in used, but non-working cells, make it ideal for the extraction of cobalt and nickel and other commercially useful materials including iron, lithium, manganese, aluminum, copper, and plastic. Recycling facilities face technical challenges in properly discharging and processing lithium batteries in a safe and efficient manner in order to extract the commercially useful materials.

SOME EXAMPLE EMBODIMENTS

Therefore, there is a need for an approach for increasing the extraction efficiency of commercially useful materials in Li-ion batteries. The extracted product can be reused at second stage processing facilities.

According to one embodiment, a method includes sorting of a mixed chemistry of batteries including lithium (Li) and one or more of alkaline, nickel metal hydride (Ni-MH) and nickel cadmium (Ni—Cd). Li-ion batteries are sorted from the other battery types for additional processing. Plastic packages or casings that house the Li-ion cells are crushed such that the lithium ion cells can be isolated from the plastic package or casing. The sorted Li-ion batteries are then discharged in a saline solution and dried. The Li-ion batteries are shredded into pieces and undergo magnetic separation to remove metal including iron. Aluminum and copper can be removed from a mixed metal powder using air separation. Air separation isolates smaller sized particles containing the mixed metal powder comprising Li and at least one of cobalt, nickel, manganese and carbon.

According to another embodiment a method includes sorting of a mixed chemistry of batteries including Li and one or more of alkaline, Ni-MH and Ni—Cd. Li-ion batteries are sorted from the other battery types for additional processing. Plastic packages or casings that house the Li-ion cells are crushed such that the Li-ion cells can be isolated from the plastic package or casing. The sorted Li-ion batteries are then discharged by heating in an oven or kiln. A second heating is performed to produce a mixed metal material and optionally cooled. The mixed metal material is shredded into pieces and undergoes magnetic separation to remove iron. Aluminum and copper can be removed from a mixed metal powder using air separation. Air separation isolates smaller sized particles containing the mixed metal powder comprising Li and at least one of cobalt, nickel, manganese, and carbon. Fume mitigation can optionally be performed to reduce environmental impact.

In yet another embodiment, a method includes discharging EV batteries with resistors and fuse to discharge the EV batteries by module or cell. The method includes disassembly of EV batteries to separate into modules or cells. The cells or modules are sheared, chipped or shredded into pieces. The mixed metal material is shredded into pieces and undergoes magnetic separation to remove iron. Aluminum and copper can be removed from a mixed metal powder using air separation. Air separation isolates smaller sized particles containing the mixed metal powder comprising Li and at least one of cobalt, nickel, manganese and carbon. Fume mitigation can optionally be performed to reduce environmental impact.

In yet a further embodiment, a method includes sorting of a mixed chemistry of batteries including Li and one or more of alkaline, Ni-MH and Ni—Cd. Li-ion batteries are sorted from the other battery types for additional processing. Plastic packages or casings that house the lithium ion cells are crushed such that the lithium ion cells can be isolated from the plastic package or casing. A water sprinkler systems can be employed in the event of any fire caused by crushing of the casing. The sorted Li-ion batteries are then discharged by heating in an oven or kiln. The cells or modules are sheared, chipped or shredded into pieces. The mixed metal material is shredded into pieces and undergoes magnetic separation to remove iron. Aluminum and copper can be removed from a mixed metal powder using air separation. Air separation isolates smaller sized particles containing the mixed metal powder comprising Li and at least one of cobalt, nickel, manganese and carbon.

In yet a further embodiment, a method includes sorting of a mixed chemistry of batteries including Li and one or more of alkaline, Ni-MH and Ni—Cd. Li-ion batteries are sorted from the other battery types for additional processing. Plastic packages or casings that house the lithium ion cells are crushed such that the lithium ion cells can be isolated from the plastic package or casing. Li-ion cells are punched and then deposited in a bath of water to mitigate fires or fumes. The sorted Li-ion batteries are then discharged by heating in an oven or kiln. The cells or modules are sheared, chipped or shredded into pieces. The mixed metal material is shredded into pieces and undergoes magnetic separation to remove iron. Aluminum and copper can be removed from a mixed metal powder using air separation. Air separation isolates smaller sized particles containing the mixed metal powder comprising Li and at least one of cobalt, nickel, manganese and carbon.

Still other aspects, features, and advantages of the invention are readily apparent from the following detailed description, simply by illustrating several particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and system for providing an integrated recycling complex to discharge and process Li-ion batteries are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
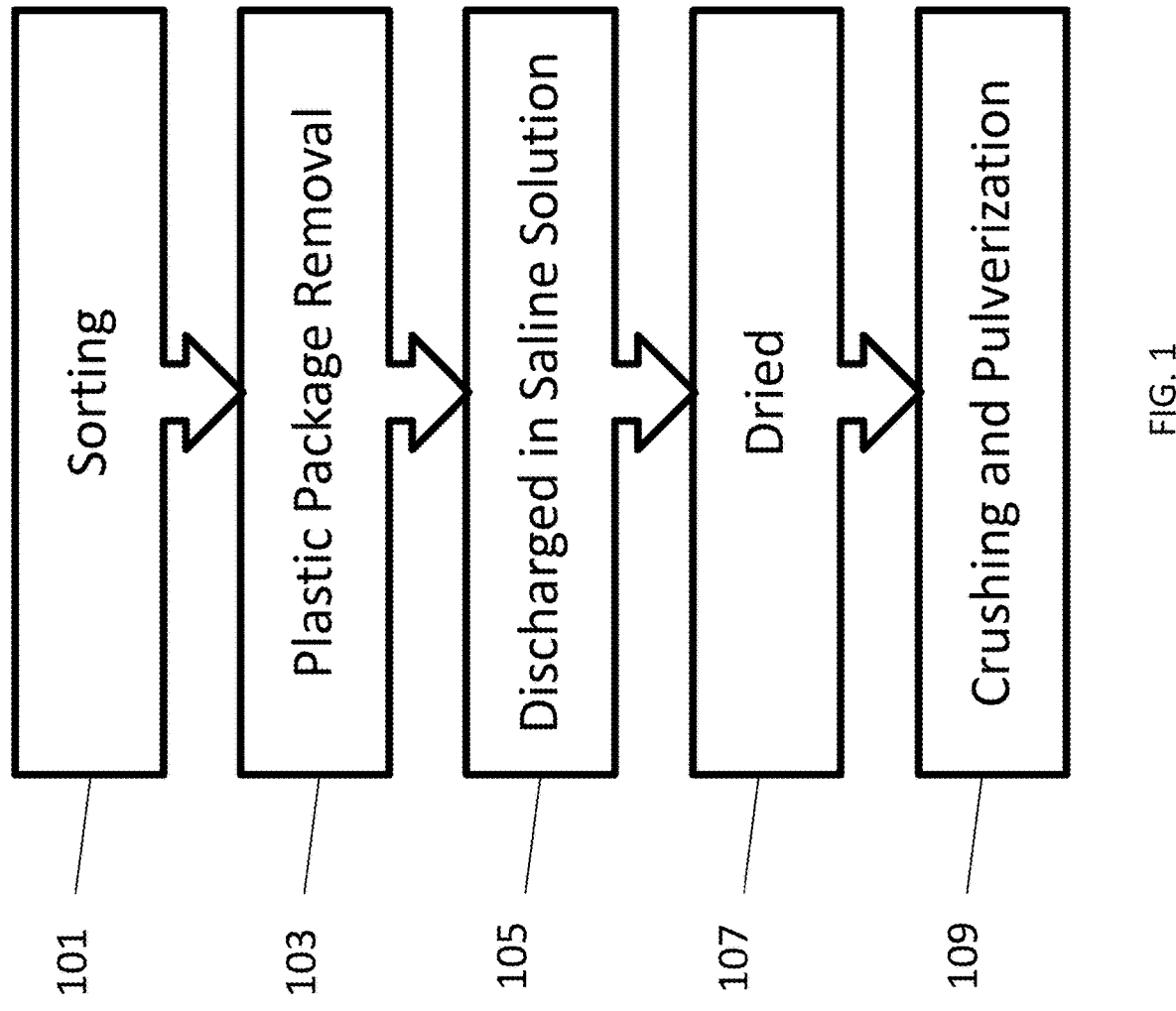
FIG. 1 is a flowchart of a process for providing an integrated recycling complex to discharge and process Li-ion batteries, according to one embodiment.

FIG. 1 is a flowchart of a process for providing an integrated recycling complex to discharge and process Li-ion batteries. The process includes steps of sorting 101; plastic removal 103; discharging in a saline solution 105; drying; and crushing and pulverization 109. In this embodiment, the Li-ion batteries are discharged in a saline or brine solution, dried, then shredded in a separator shredder to produce a final product referred to herein as "black sand". This final product is a processed material having a high concentration of metals which is ideal for further processing by second stage processors, such as Umicore®, Sungeel®, Glencore®, or other materials technology and recycling processors. The present inventive process efficiently produces the "black sand" that has a high metal concentration of Li and at least one of cobalt, nickel and manganese. Separately, from the "black sand" product stream is a second product stream containing one or more of aluminum, copper, plastic, and iron. The processes described herein reduces the cost of shipping batteries in half, since a container of batteries is reduced by half when it is reduces into a container of black sand.

Figure 2:
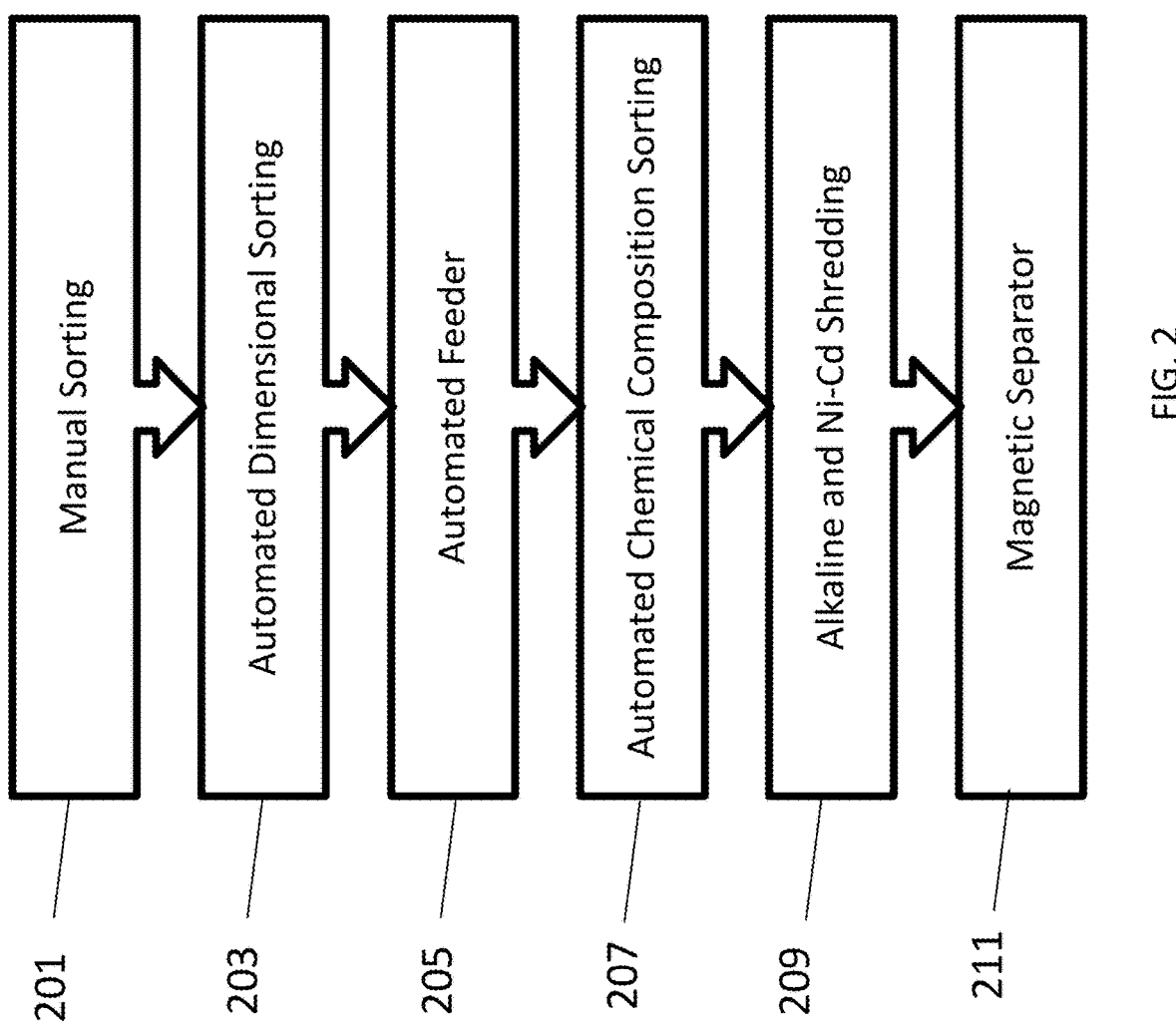
FIG. 2 is a flowchart of a sorting process of FIG. 1, according to one embodiment.

Sorting step 101 in FIG. 1 includes a sorting of a mixed chemistry of batteries. Multiple chemistries of batteries are sorted and sent to an appropriate downstream processor. Battery types include, but are not limited to Li-ion, alkaline, Ni—MH and Ni—Cd. Mixed chemistry batteries can be received in the recycling facility and undergo a series of sorting steps, as illustrated in FIG. 2. A manual sorting 201 of the mixed chemistry batteries can occur once received at a recycling facility. Automated dimensional sorting 203 and automated feeder steps are discussed further below with reference to FIG. 4. Automated chemical composition sorting 207 is discussed below with reference to FIG. 5. Alkaline and Ni—Cd shredding 209 and magnetic separation 211 are discussed below in reference to FIG. 6.

Figure 3:
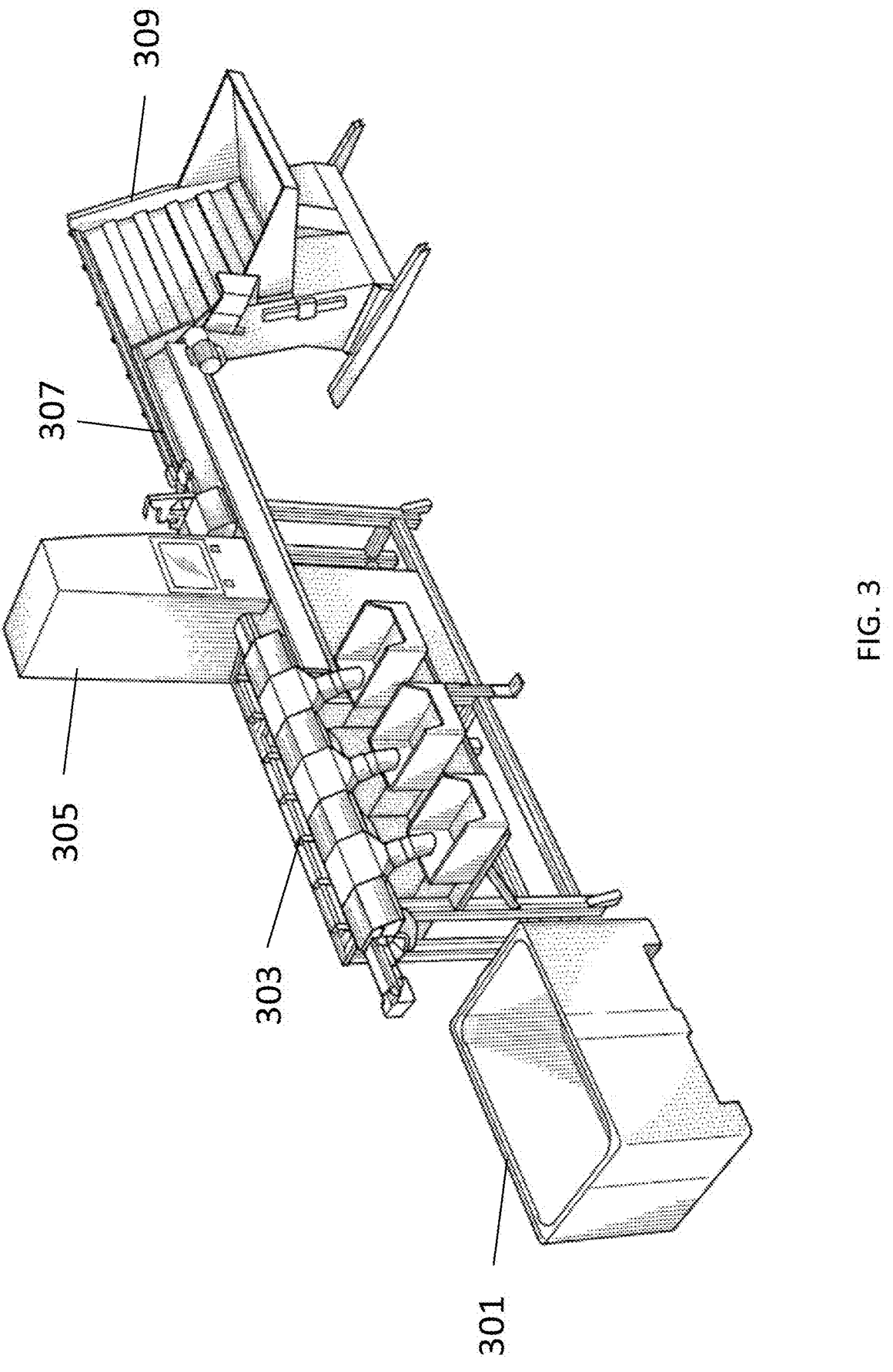
FIG. 3 is an illustration of hardware for the sorting process of FIG. 1, according to one embodiment.

FIG. 3 is an example of hardware that is configured to optically sort the mixed chemistry batteries and includes a plurality of bins for receiving respective battery types. The optical sorting scanner depicted in Hardware 305 detects the chemistry of the subject battery from a database of optical features. Batteries are loaded into Bin 309 and aligned to travel in a consistent manner and sorted by chemistry by optical scanning in Hardware 305 and deposited in Bin 301 and Bins 303 based on chemistry.

Figure 4:
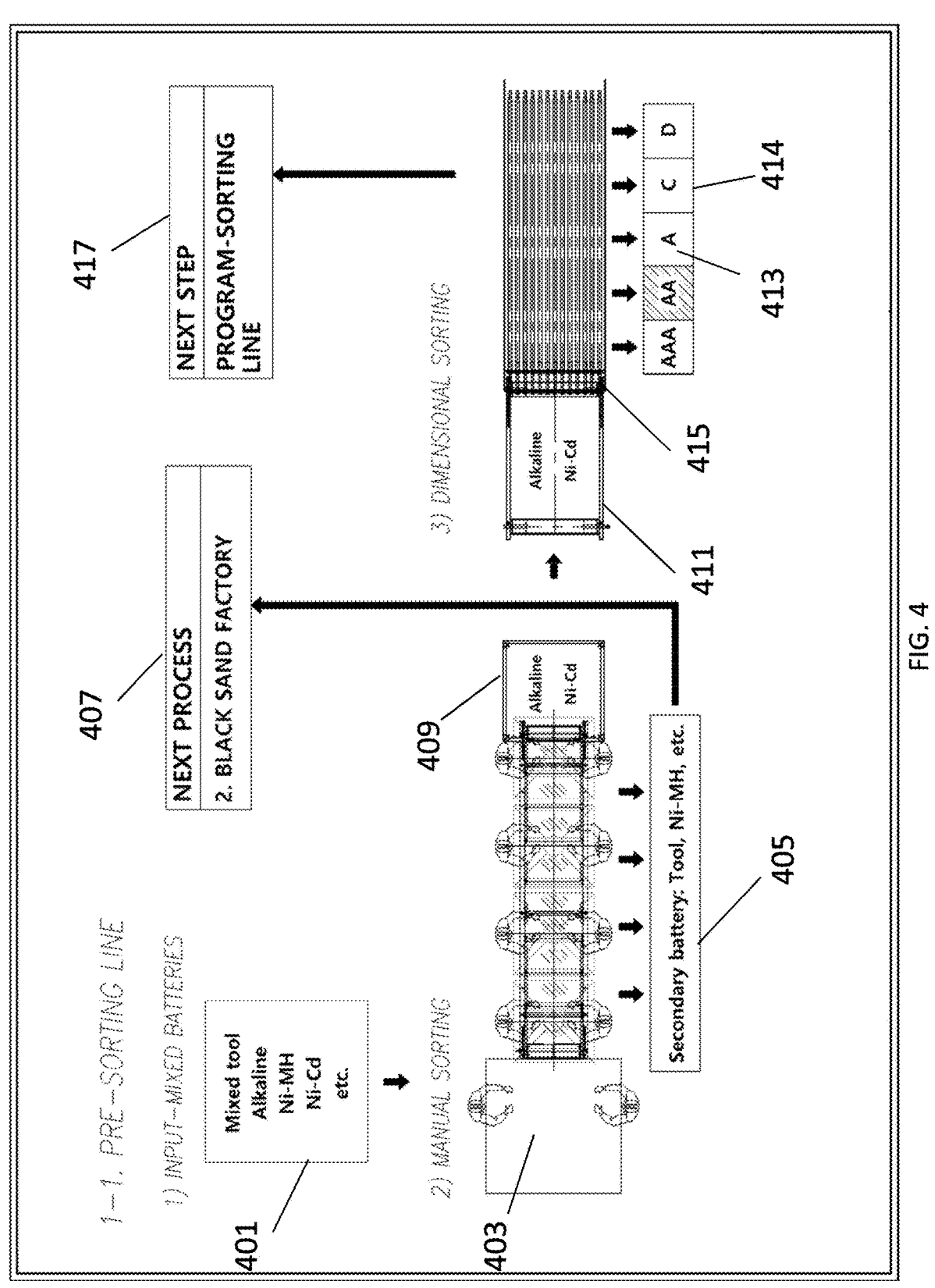
FIG. 4 is a diagram of manual and dimensional sorting processes of FIG. 2, according to one embodiment.

FIG. 4 is another example of receiving an input of mixed chemistry batteries 401 at a recycling facility and sent to a manual sorting station 403 where a plurality of workers at the recycling facility manually sort through the mixed chemistry batteries 401 that are delivered by a conveyor belt that lifts and conveys the mixed batteries 401 through the manual sorting station 403. In this example, secondary batteries 405 are manually separated and can include Ni—MH, power tools, etc. that are sent to further processing at a "black sand" factory 407. Alkaline and Ni—Cd battery types 409 are manually sorted and then proceed for further processing at the dimensional sorting station. Dimensional sorting separates the alkaline and Ni—Cd batteries in separate bins 414 based on battery type. For example, the alkaline and Ni—Cd batteries 411 can be separated into AAA, AA, A, C or D type batteries 413 by the automated dimensional sorting unit 415 which separates the AAA, AA, A, C and D type batteries 413 into individual bins or containers 414. The automated dimensional sorter 415 is configured to separate the AAA, AA, A, C and D type batteries 413 by size through a shaking mechanism. For example, the shaking mechanism separates that larger C and D type batteries from the smaller AAA, AA and A batteries, and continues shaking until each battery type is separated by size in its respective bin. The dimensionally sorted AAA, AA, A, C and D type batteries 413 are then transferred to program sorting line 417 which is described further in FIG. 5. The Li-ion batteries that are manually separated from the manual sorting station 403 are fed to a first stage processing.

Figure 5:
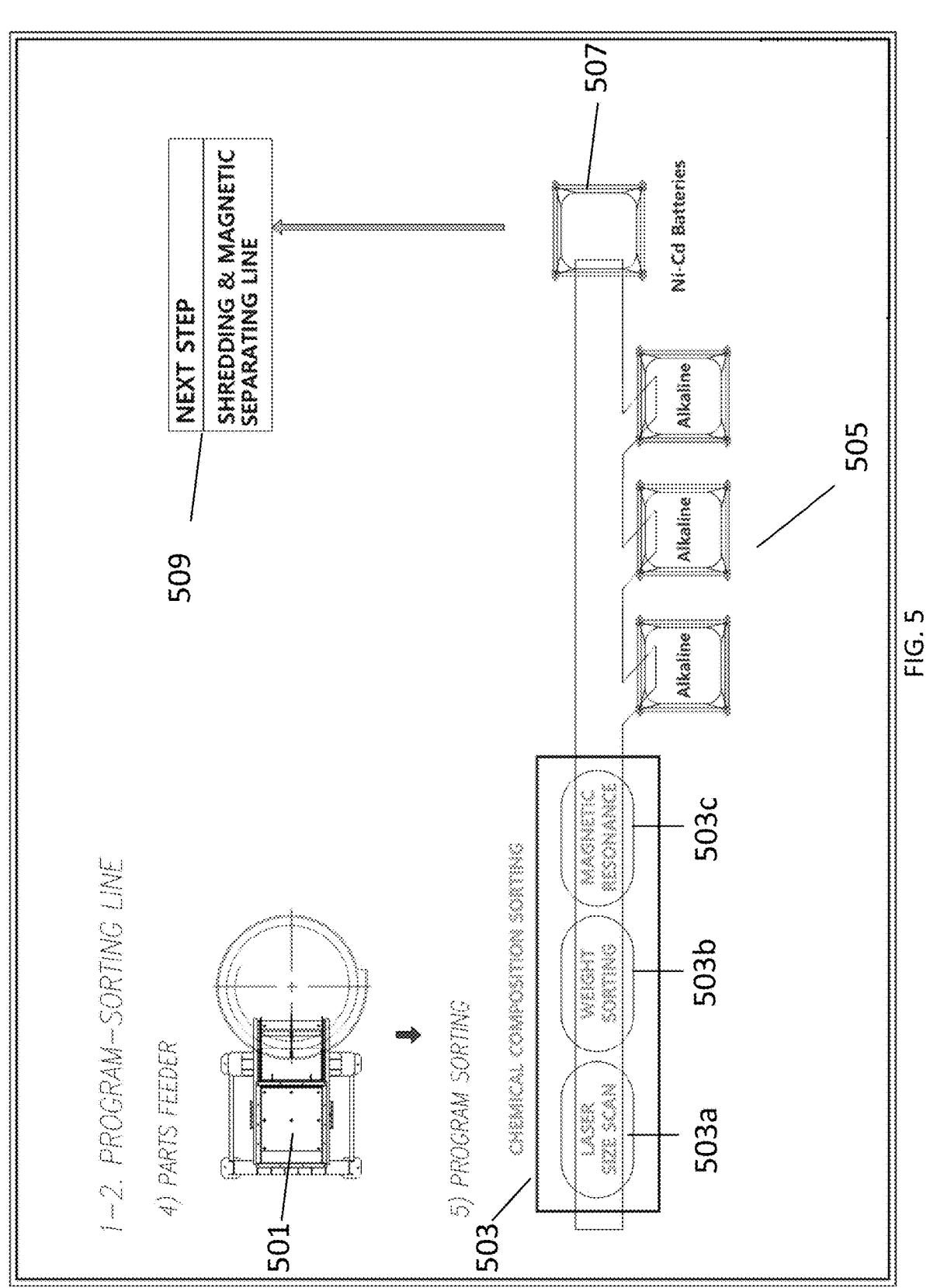
FIG. 5 is a diagram of a program-sorting line process of FIG. 2, according to one embodiment.

In FIG. 5, a parts feeder 501 aligns the alkaline and Ni—Cd batteries 409 for the program sorter 503. The program sorter 503 uses size, weight and magnetic resonance scanner to identify the chemical composition of the alkaline and Ni—Cd batteries 409 such that they can be separated from one another in bins 505 for the alkaline batteries and bin 507 for the Ni—Cd batteries. The program sorting includes a laser 503a for identifying batteries by size; a weight sorter 503b for separating batteries by their individual weight; and a magnetic resonance scanner 503c that can distinguish the chemical composition of alkaline batteries from Ni—Cd batteries by viewing the interior of each battery to determine if the battery is alkaline or Ni—Cd. The separated alkaline and Ni—Cd batteries are then sent for further processing at the shredding and magnetic separating station 509 that is described further in FIG. 6.

Figure 6:
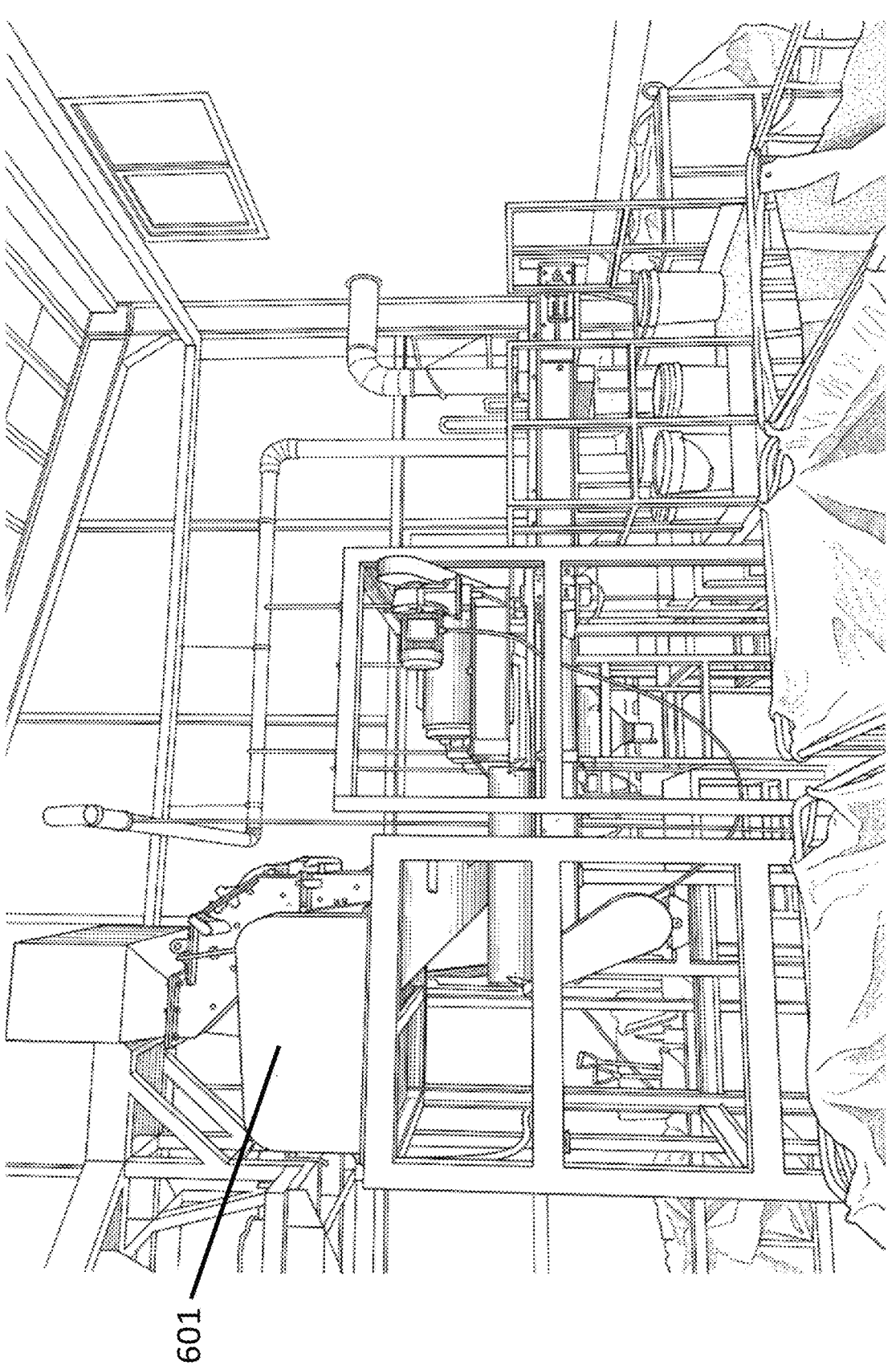
FIG. 6 is an illustration of hardware for the plastic removal process of FIG. 1, according to one embodiment.

FIG. 6 illustrate an example of hardware configured for the shredding and magnetic separation of batteries to isolate cells from the batteries. The battery packs received at this station are typically provided with plastic casings or housings that are crushed to allow access to the interior cells. The cells are retrieved by way of a magnetic separation process to separate the metal containing cells and plastic. An example of a plastic package removal device includes about a half ton 0.5 ton/hr capacity. The plastic packaged battery is considered the raw or input material for this machine and the iron cased battery and plastic remains are the eventual product output. The device 601 is an overall steel structure including an input chute and conveyor for receiving and transporting the plastic packaged batteries. A hammer crusher is used to crush the outing plastic housings to allow access to the interior cells. The metal containing interior cells are isolated from the plastic remains by a magnetic separator. An output conveyor is used to remove the remaining plastic pieces from the housing.

Figure 7:
FIG. 7 is an illustration of the discharge process of FIG. 1, according to one embodiment.

FIG. 7 is an illustration of the discharge process 105 of FIG. 1, according to one embodiment. A saline or brine solution is provided for the battery cells that have been separated from their housings or casings. The battery cells 701 are soaked in the saline or brine solution. The saline or brine solution can be an aqueous solution of sodium chloride (NaCl), sodium sulfate (NaSO$_4$), iron sulfate (FeSO$_4$) or zinc sulfate (ZnSO$_4$). The saline or brine solution provides an effective discharge of the battery cells. The presence of metal particles in the battery cells significantly enhances the electrochemical discharge reaction. The battery cells can soak in the bins 703 containing the saline or bine solution for several days with or without agitation such as stirring. The battery cells are removed from the saline or brine solution and can be dried prior to the shredding and separation processing as discussed below in reference to FIG. 8.

Figure 8:
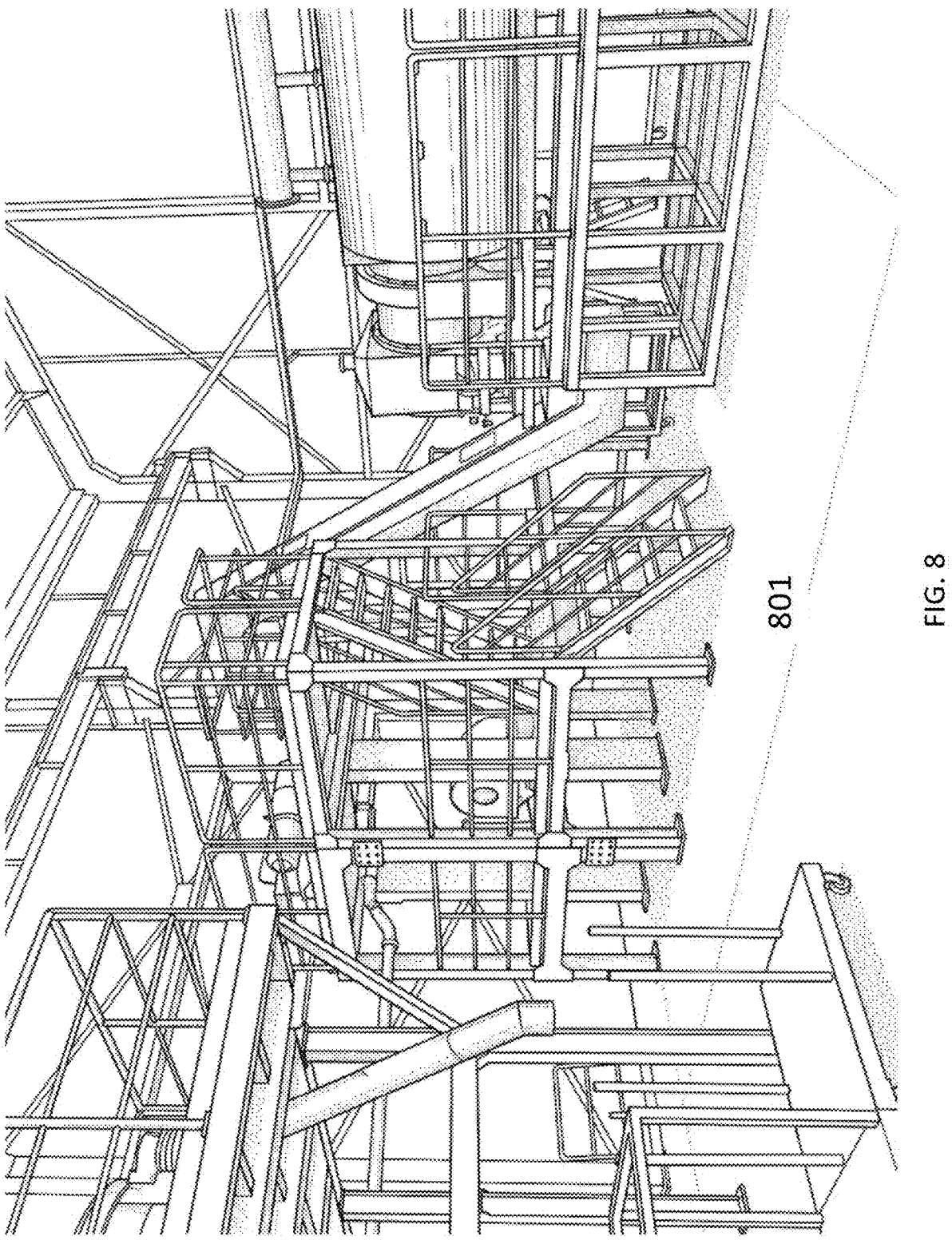
FIG. 8 is an illustration of hardware for the shredding and separating processes of FIG. 1, according to one embodiment.
Figure 9:
FIG. 9 is an illustration of a final processed metal material, according to one embodiment.

FIG. 8 is an illustration of hardware for the shredding and separating (e.g., crushing and pulverization) process 109 of FIG. 1, according to one embodiment. The crushing and pulverizing hardware 801 has a capacity of nearly a ton, e.g., 0.7 ton/hour. Electrode scrap, such as discharged battery cells, is crushed and pulverized such that Cu chips and carbon powder can be extracted as product. The crusher and pulverizer includes a shredder, cut crusher, hammer crusher and a cyclone and rotary valve vibrating screen. The cut crusher ensures smaller parts and smaller powder. The electrode scrap is put through multiple shredders. In one example, a first shredder tears the battery cell material into large pieces or chunks. Then the second shredder uses a cutting mill. The cutting mill includes a fixed knife and a rotating moving knife combination to reduce the size of the large pieces from the first shredder. A hammer crusher is also used to further reduce sizes of the pieces. The shredded material then passes through a mesh, such as but not limited to a size 40 mesh to ensure proper sizing of the mixed metal powder. Next, mixed metal powder passes through a magnetic separation to pull out iron material. Once the iron is removed from the mixed metal powder, an air table can be used to separate aluminum and copper from the powder by way of a cyclone separation technique. A cyclone separation uses a centrifugal separator in which particles, due to their mass, are pushed to the outer edges as a result of centrifugal force. This separation technology including different sized mesh screens and a cyclone separation isolates the smaller sized particles that make up the concentrated "black sand" containing high concentrations of valuable materials including cobalt, nickel, manganese, lithium and carbon. FIG. 9 is an illustration of the final product-"black sand" 901 which is a high concentration of valuable materials including cobalt, nickel, manganese, lithium, and carbon that can be further utilized by second stage processors. Concentration rates of each of the materials in the "black sand" depend on the metal content of the source material and range from cobalt 5-40%, nickel 5-40%, manganese 5-20%, lithium 5-10%, and carbon 20-40%.

A powder packaging machine can be used for packaging of the electrode powder. The machine's capacity is approximately 0.75 ton/4.5 hr/1 batch. The dispensing portion includes a hopper, vibrator, screw conveyor and roller type working table. A packaging machine is also provided for packing powder for shipment to other facilities. The packaging machine includes an input table, and first and second hammer crushers. The powder packaging machine is depicted in the layout of FIG. 16B below.

Figure 10A:
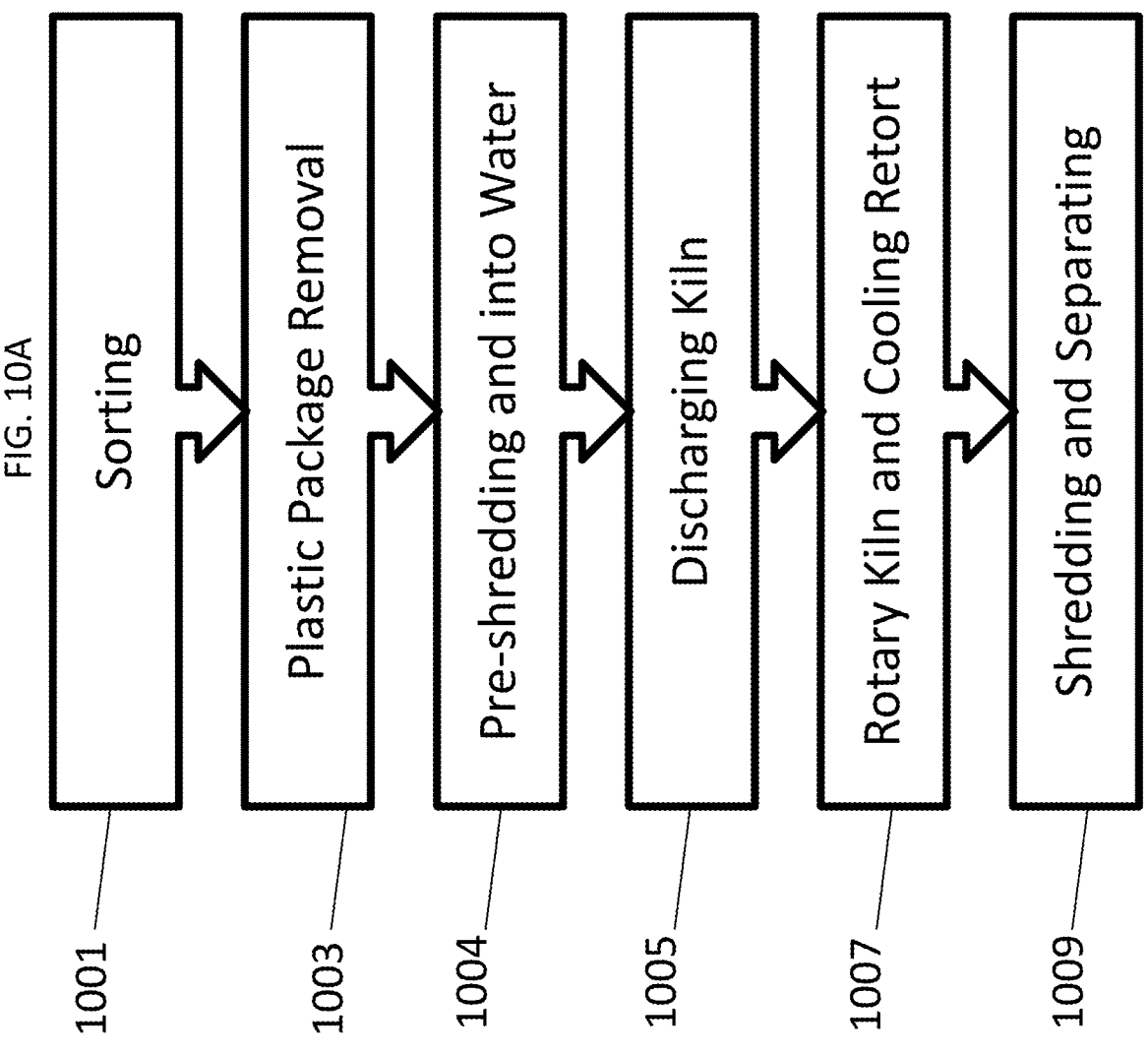
FIG. 10A is a flowchart of a process for providing an integrated recycling complex to discharge and process Li-ion batteries, according to another embodiment.

FIG. 10A is a flowchart of another process for providing an integrated recycling complex to discharge and process Li-ion batteries. Sorting step 1001 and plastic package removal step 1003 are substantially the same as discussed above with respect to FIG. 1. Before the discharging kiln, a pre-shredding step 1004 punches or punctures batteries and then drops them into a solution. The punched/punctured then hit a conveyer and move slowly out of the water into the discharging kiln or other kiln process. The pre-shredder feeds batteries into a punch mill or crusher that pierces or punctures the batteries and drops them into a saline or water solution. In order to punch the batteries to allow for the electrolyte to dry out in the discharging kiln, the batteries are put through a pre-shredder that punches batteries and drops them into a water solution. The water extinguishes any flames or emissions from the punching, but the batteries are still processed through a kiln to fully discharge and evaporate the electrolyte under heat. The puncturing or piercing increases the speed of the discharging process of the discharging kiln, which would otherwise take additional time to open up the batteries under the heat.

Figure 10B:
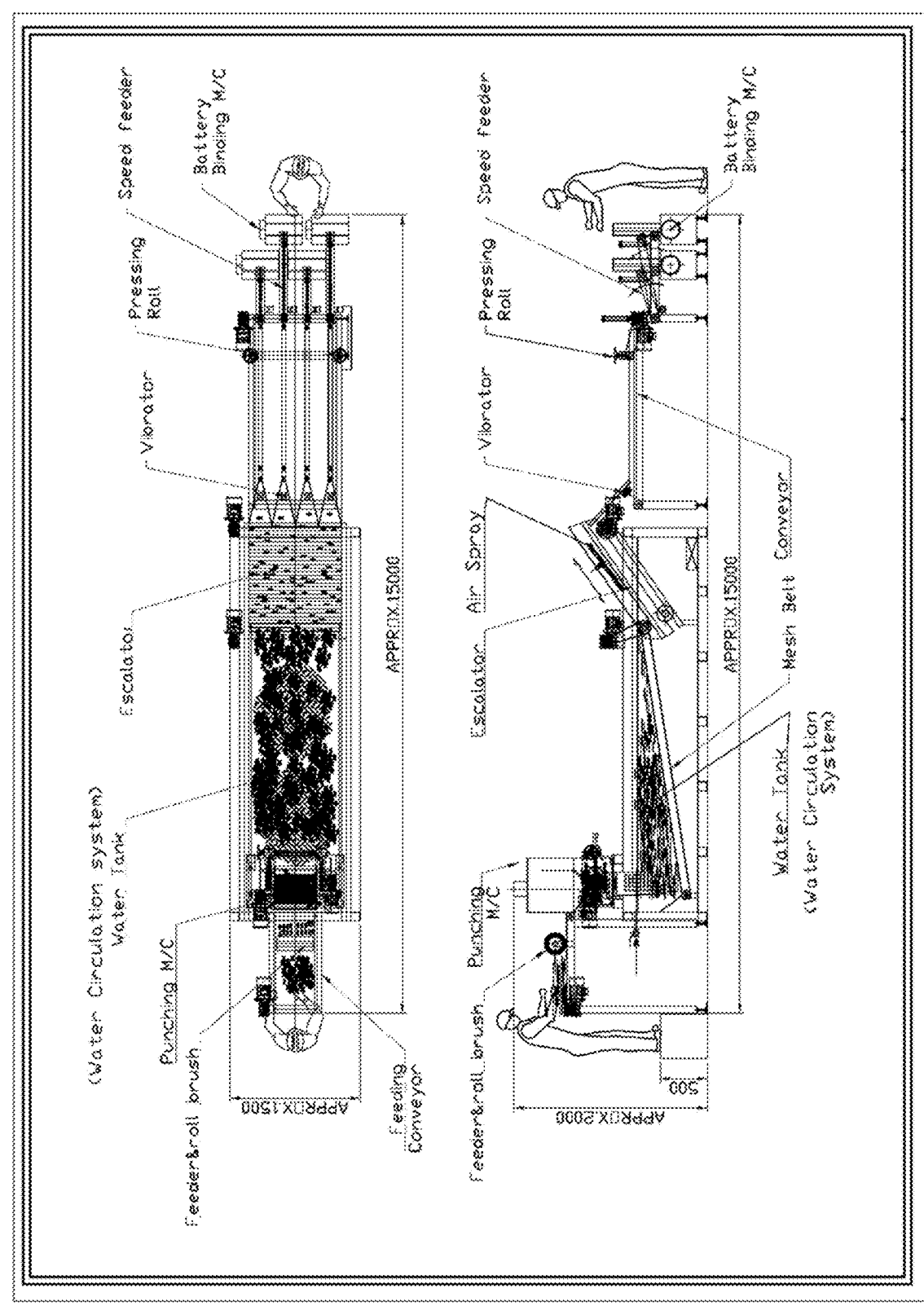
FIG. 10B is a diagram of a pre-shredder punching mill used in the process flow of FIG. 10A, according to one embodiment.

FIG. 10B provides a top and a side view of the pre-shredder punching mill used in the process flow of FIG. 10A. Batteries are placed on a feeder and roll brush and transported to a punching assembly that pierces or punctures each battery to allow for the electrolyte to dry out faster in the discharging kiln. A water tank receives the punctured/pierced battery. The tank can include water or a saline solution. A water circulation system is provided in the tank. A mesh belt and conveyor then transports the batteries out from the water tank. The batteries are exposed to an air spray and vibrating conveyor and then moved to a pressing roll and speed feeder. A battery binding can also be performed before the batteries are transported to the kiln or oven to fully discharge and evaporate the electrolyte under heat.

The discharging step 1005 in FIG. 10A is performed in a kiln or oven. The battery cells that have been isolated from their plastic housings or casings are then transferred to the discharging kiln. Battery cells can be fully discharged in approximately one hour at 150-180° C. Other temperatures and discharging times can vary depending on the number of battery cells being discharged. In this embodiment, the heat dries the electrolyte of the battery cell and results in a discharged battery. In certain embodiments, entire EV modules can be heat discharged without manual disassembly thereby reducing the cost of manual labor and increasing efficiency.

The process flow in FIG. 10A is efficient and significantly reduces to processing time of conventional process by up to 75%. The process flow of FIG. 10A is can be completed in approximately one hour. Thus, from the starting battery to a completed black sand will take about one hour to complete with the present process flow. The discharging kiln, rotary kiln, cooling retort and shredder each takes approximately 15 minutes to complete. In terms of the amount of material processed with the present process flow, the following amounts are achieved: 100 kgs/15 min=400 kgs/hour; 400 kg×8 hrs=3.2 tons/day; 3.2 tons/day×20 days=64 tons/ month (e.g., about 3 containers a month for 1 shift). In certain embodiments 100-200 kgs/15 min is achievable.

Figure 11:
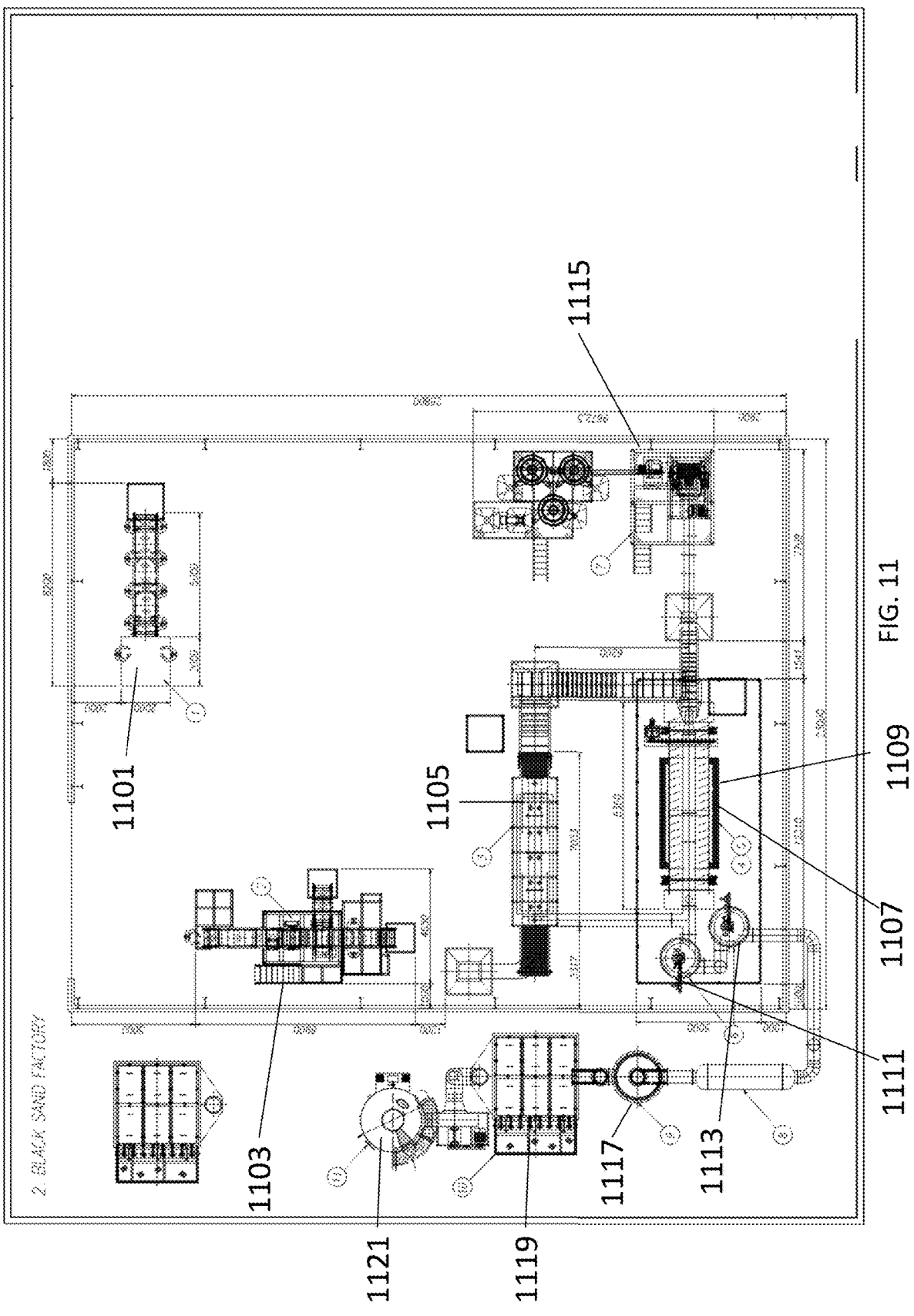
FIG. 11 is a diagram illustrating the process flow of FIG. 10A, according to one embodiment.

FIG. 11 is an example of a layout for a "black sand" recycling facility. An example of the facility is at least 20,000 square feet (excluding the fume mitigation portion). The larger the facility, the more target product can be produced. In this example the recycling includes a sorting conveyor 1101 where manual sorting of the mixed chemistry batteries is performed with conveyance of the batteries along a conveyor and manual separation by workers at the recycling facility, similar to that described above for FIG. 4. The plastic package processing machine 1103 is configured to remove the outer plastic housing or casing surrounding the battery cells, similar to that described above for FIG. 6. The crushing and pulverization unit 1115 is configured to perform the shredding and separating (e.g., step 1009 of FIG. 10A). An electric discharge kiln 1105 is provided to discharge the battery cells by heat to dehydrate the electrolyte contained in the battery cell.

In FIG. 11, a rotary kiln 1107 and optional cooling retort 1109 are provided to heat the discharged battery cells at an elevated temperature to reduce the battery material down to core metals. The rotary kiln 1107 ensures purity and efficiency of the metal retrieval process. The rotary kiln has a capacity of about 1 ton/hr. It provides a high temperature calcination with a treatment temperature of over 500° C. for approximately one hour. In other example, the treatment temperature can reach up to 900° C. The driving mechanism includes a drum rotating type continuous kiln with screw blade. The rotary kiln 1107 is an overall steel structure that includes a drum rotating part, ceramic insulation structure, ventilation unit, heater (e.g., radiant tube type heater) and user control panel. A conveyor is provided to transfer the calcined product to the cooling retort 1109.

First burn-out 1111 and second burn-out 1113 devices are used in conjunction with process emission control during the electric discharge kiln (step 1005) and the rotary kiln and cooling retort process (step 1007). A vacuum duct system that includes the first burn-out device 1111, second burn-out device 1113 and wet scrubber 1121 is configured to remove process emissions during the electric discharge kiln (step 1005) and the rotary kiln and cooling retort process (step 1007). A heat exchanger extending from the second burn-out device 1113 is configured to exchange heat from the burn-out 1113 to the cyclone separator 1117. The cyclone separator 1117 is configured to generate centrifugal force to separate particles based on their mass. Different material will separate based on their respective mass. The recycling layout example of FIG. 11 further includes a metal dust collector that employs a vacuum duct system that collects metal dust from the crushing and pulverization step (e.g., step 1009 in FIG. 10A). An air bag filter 1119 recollects and allows reuse of the metal dust.

Figure 12:
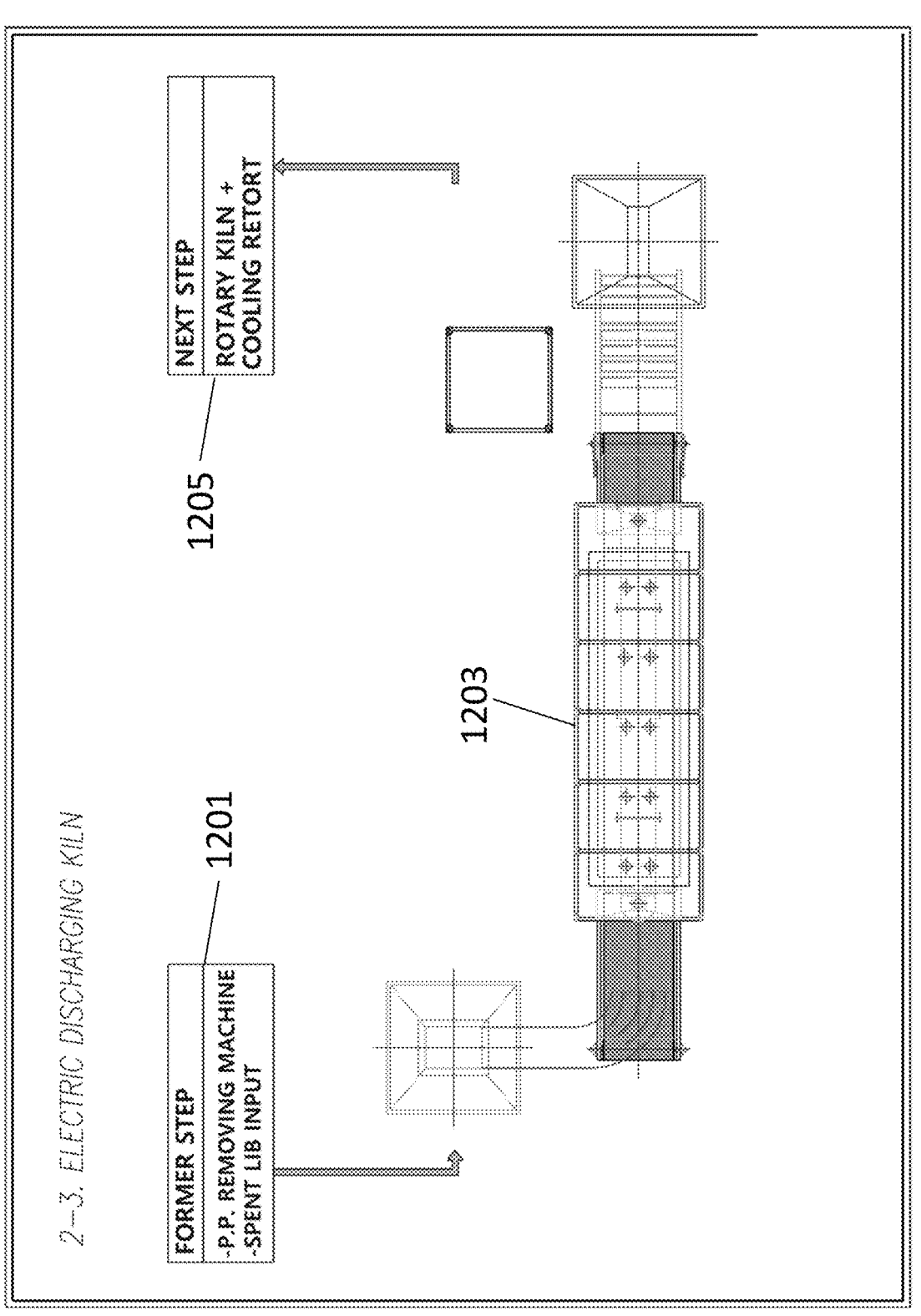
FIG. 12 is a diagram of the discharging kiln process of FIG. 10A, according to one embodiment.

FIG. 12 is a diagram of an electric discharging kiln. The battery cells are received at the kiln 1203 from the prior process which removed the plastic casings/housings. The kiln 1203 is configured to generate heat to dry out the electrolyte in the battery cell and effectively discharge the battery cell. Battery cells can be fully discharged in approximately one hour at a temperature range of 150-300° C. Other temperatures and discharging times can be implemented depending on the number of battery cells being discharged. The discharged battery cells are then delivered to the rotary kiln and cooling retort 1205.

The cooling retort 1205 is an overall steel structure that is used to cool down the batteries received from the electric discharging kiln 1203 via a conveyor. The cooling retort has about a 1 ton/hr capacity. The batteries are cooled down in about one hour to a temperature of below 50° C. A rotating drum unit is used within a double jacket chamber. The cooling retort 1205 further includes a ventilation unit, water chiller and a user control panel. The water chiller provides a cooled-water spray to the rotating drum and further includes a water circulation unit.

Figure 13:
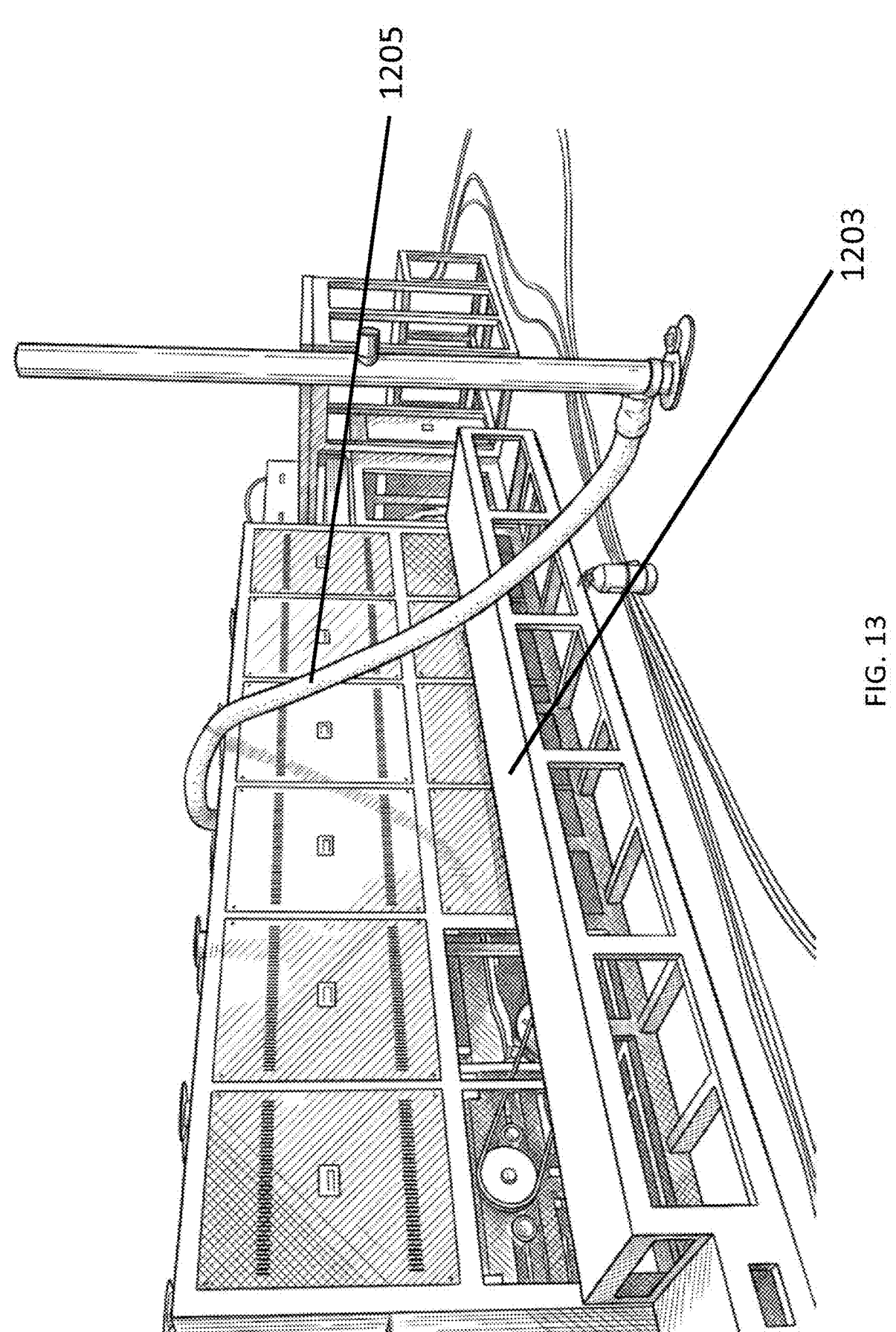
FIG. 13, is an illustration of hardware for the battery discharging process of FIG. 10A, according to one embodiment.

The electric discharge kiln 1203 is used to discharge the batteries prior to further processing. An example of an electric discharge kiln 1203 has a 1 ton/hr capacity. The raw material entering the kiln is to discharge spent Li-ion batteries. The output product of the kiln 1105 is discharged spent Li-ion batteries. The kiln 1203 is an overall steel structure with a stainless steel mesh belt driven by a motor. A ceramic insulation structure, gas heater and transformer, ventilation unit, inner chamber and a user control panel are included as parts of the kiln 1203. The electric discharge kiln 1203 is provided to discharge the battery cells with a thermal treatment between 150° C. to 300° C. which is sufficient to dehydrate the electrolyte contained in the battery cell. FIG. 13 is an illustration of the electric discharging kiln hardware 1203.

The electric discharge kiln in FIG. 13 is an automated process to ensure efficiency and reduce labor costs. A conveyor belt system is used for automation. The oven can be divided into multiple independently controlled heating zones in in order to apply the best discharging temperature for different battery types. An example of a temperature zone is about 200 to 250 Celsius. During heating, the batteries will swell and begin to lose their internal electrolyte. Some electrolyte burn-off is possible. In certain examples, the Li-ion batteries go on mesh conveyor and enter the oven at a temperature of 150-180° C. for 30-60 minutes. The heat is enough to discharge the Li-ion batteries. A nitrogen gas injector can be used as a safety mechanism in the event of fire. The nitrogen gas will extinguish any fires.

Figure 14:
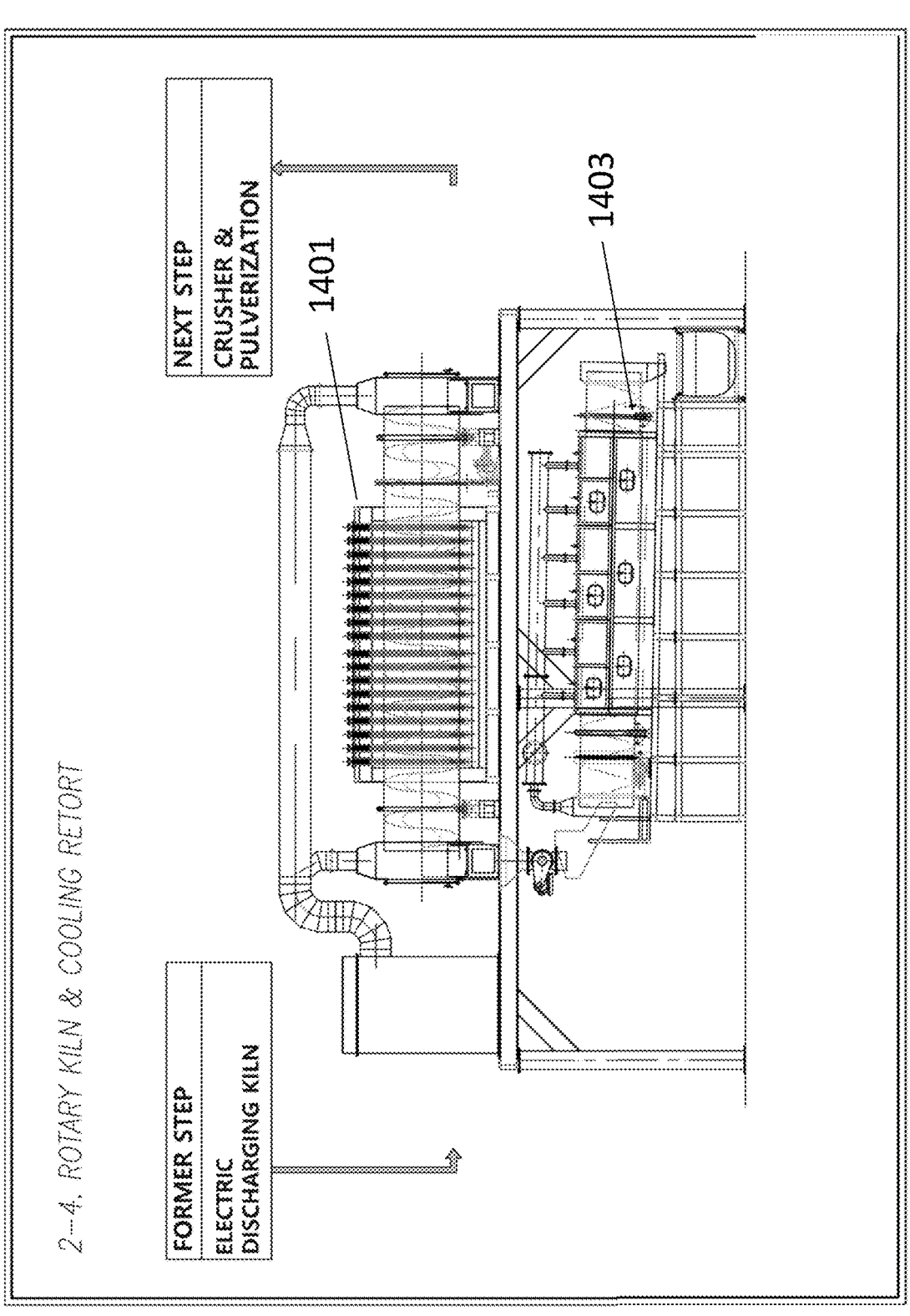
FIG. 14 is a diagram illustrating the rotary kiln and cooling retort processes of FIG. 10A, according to one embodiment.
Figure 15:
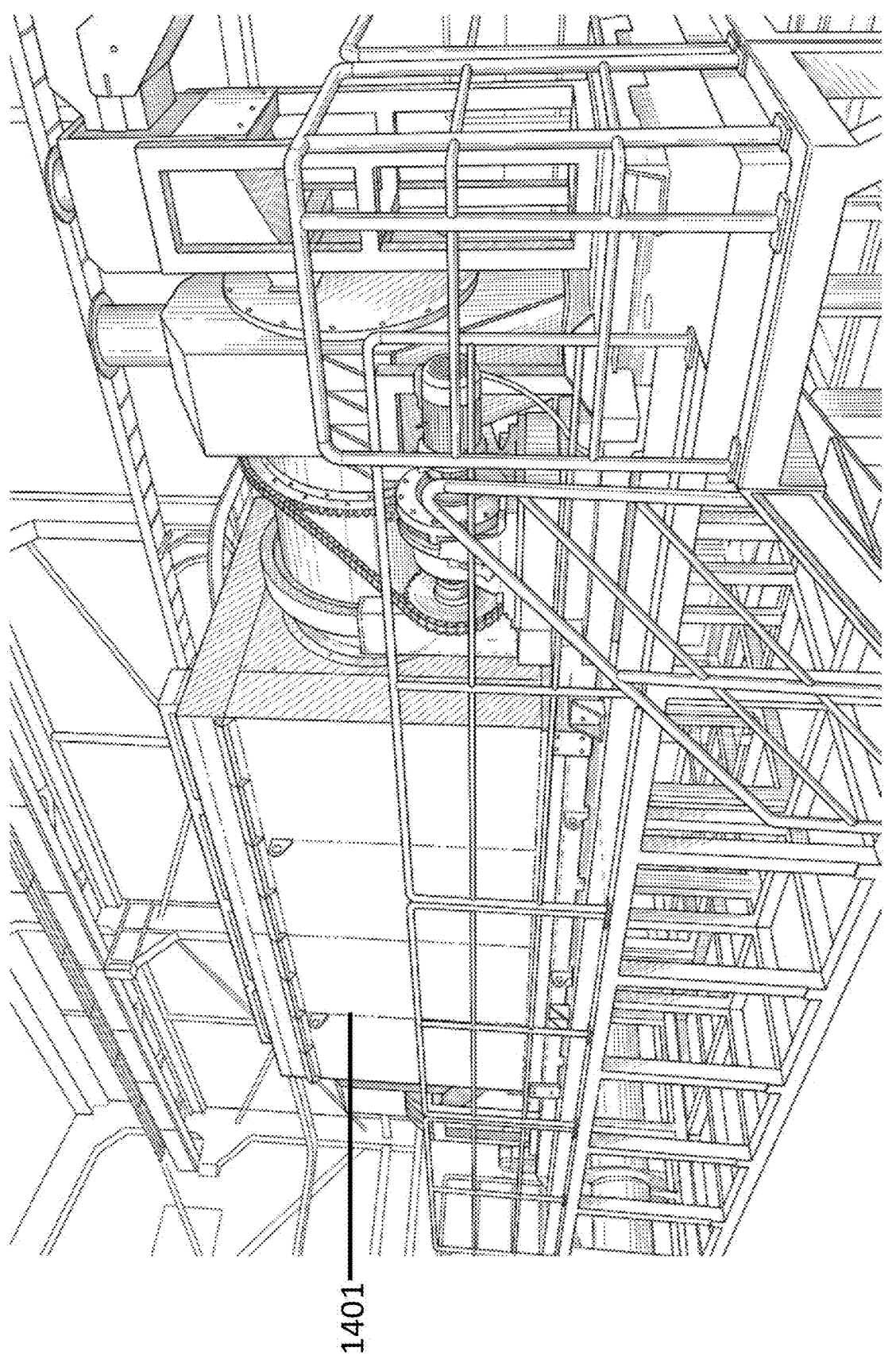
FIG. 15 is an illustration of hardware for the rotary kiln and cooling retort processes of FIG. 10A, according to one embodiment.

FIG. 14 is a diagram illustrating the rotary kiln and cooling retort process 1007 of FIG. 10A, according to one embodiment. Battery cells are heated in the rotary kiln 1401 and an optional cooling retort 1403 is positioned below the rotary kiln 1401 in this example. The rotary kiln 1401 receives battery material from the electric discharging kiln 1203. In certain examples, the battery material is rotated in a drum and supplied heat at a temperature of about 400° C. This temperature is sufficient to reduce the battery material down to the core metals. Other temperature ranges can be used to achieve the result of generating core metals. Core metal material can be optionally cooled by the cooling retort 1403. The core metal material is cooled by a heat exchanger in the cooling retort 1403 to cool the core metal material before further processing. The cooled core metal material is then transported to a shredding and separating (i.e., crushing and pulverizing) station for further processing. The shredding and separating station is substantially the same as described above for step 109 in FIG. 1 and FIG. 8. FIG. 15 is an illustration of a rotary kiln 1401 without a cooling retort 1403 disposed beneath the rotary kiln 1401. The core metal material can be left to sit until its temperature has reached a sufficient level for further processing of the core metal material.

The rotary kiln burns the batteries, and removes all remaining electrolytes, organic materials, plastic covers, impurities and labels. An operating temperature of 350 C to 650 C depending on the battery condition can be used. The batteries are burned and metals and carbon will remain. Organics, other than carbon, are removed. The process is automated to ensure efficiency and save labor costs.

Figure 16:
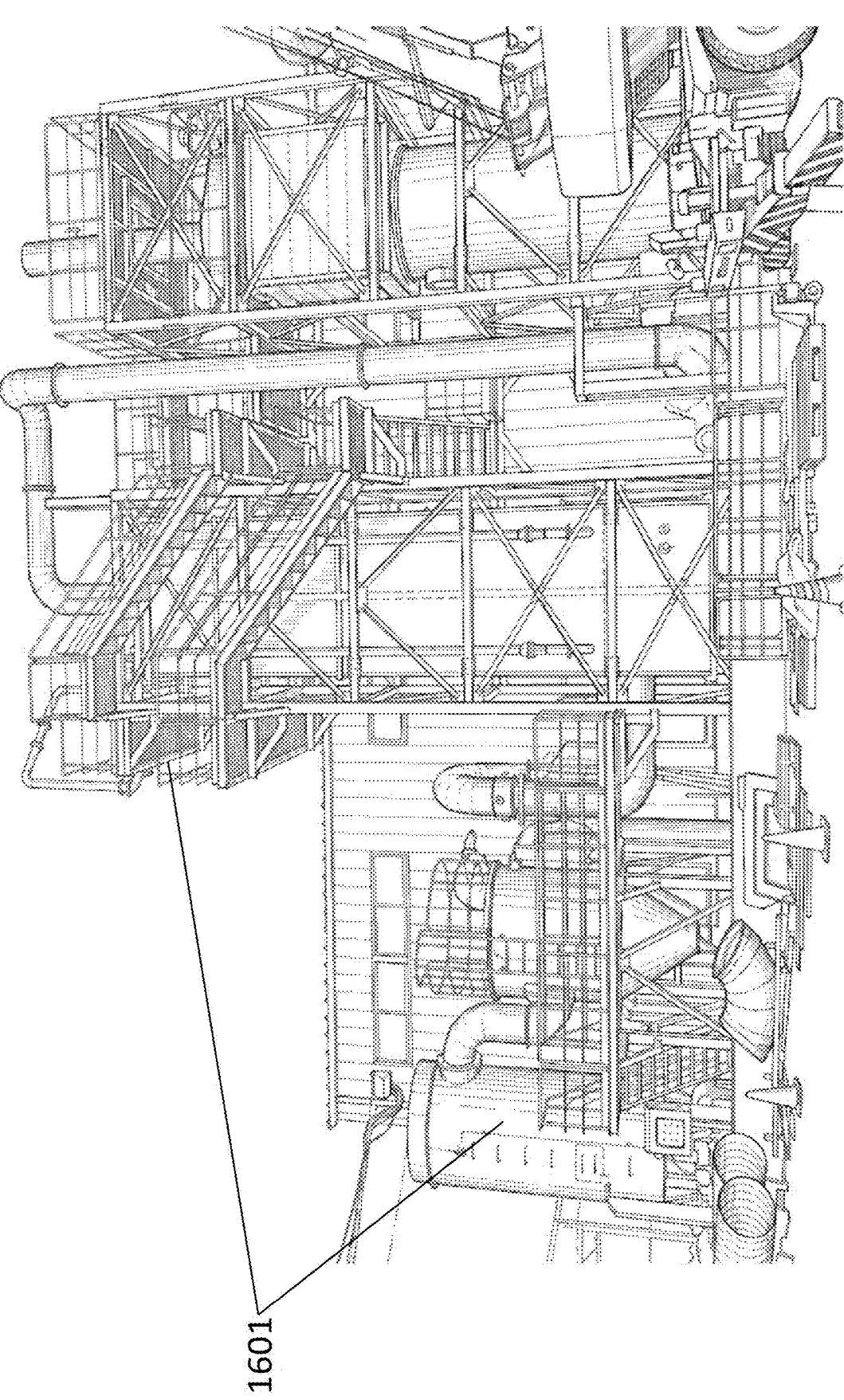
FIG. 16. is an illustration of hardware for a fume mitigation system, according to one embodiment.

FIG. 16 is an illustration of a fume mitigation system 1601 designed to reduce environmental impact of the Li-ion battery recycling processes of the present embodiments. The Tables listed below provide an outline of the chemical reactions occurring in the recycling facility and the resulting gas emissions from these reactions. With the present embodiments of the recycling facility, the total gas emissions from the discharging process and rotary kiln process are not toxic to the environment and no waste-water is generated.

Figure 16A:
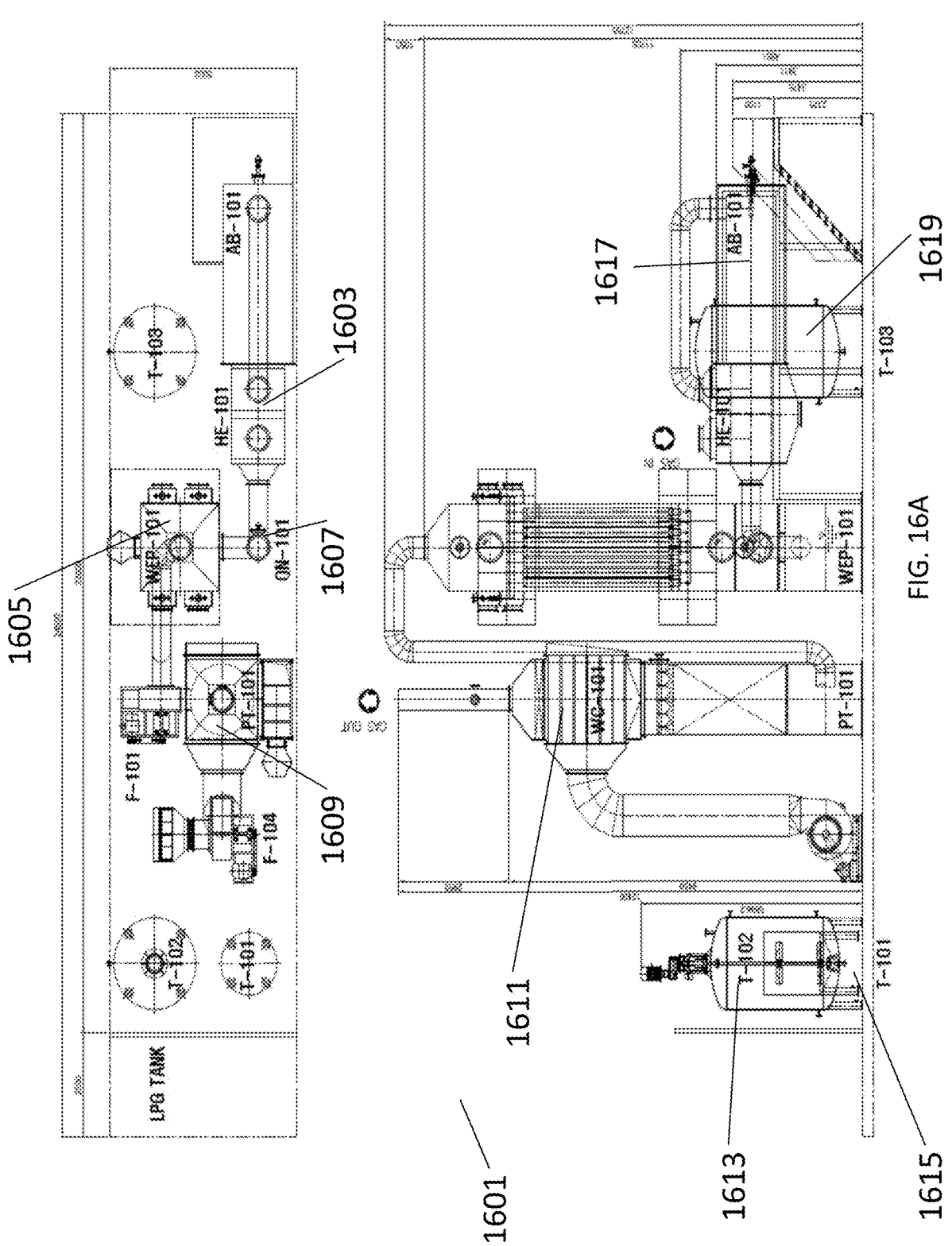
FIGS. 16A and 16B are layout diagrams of a fume mitigation system, according to one embodiment.
Figure 16B:
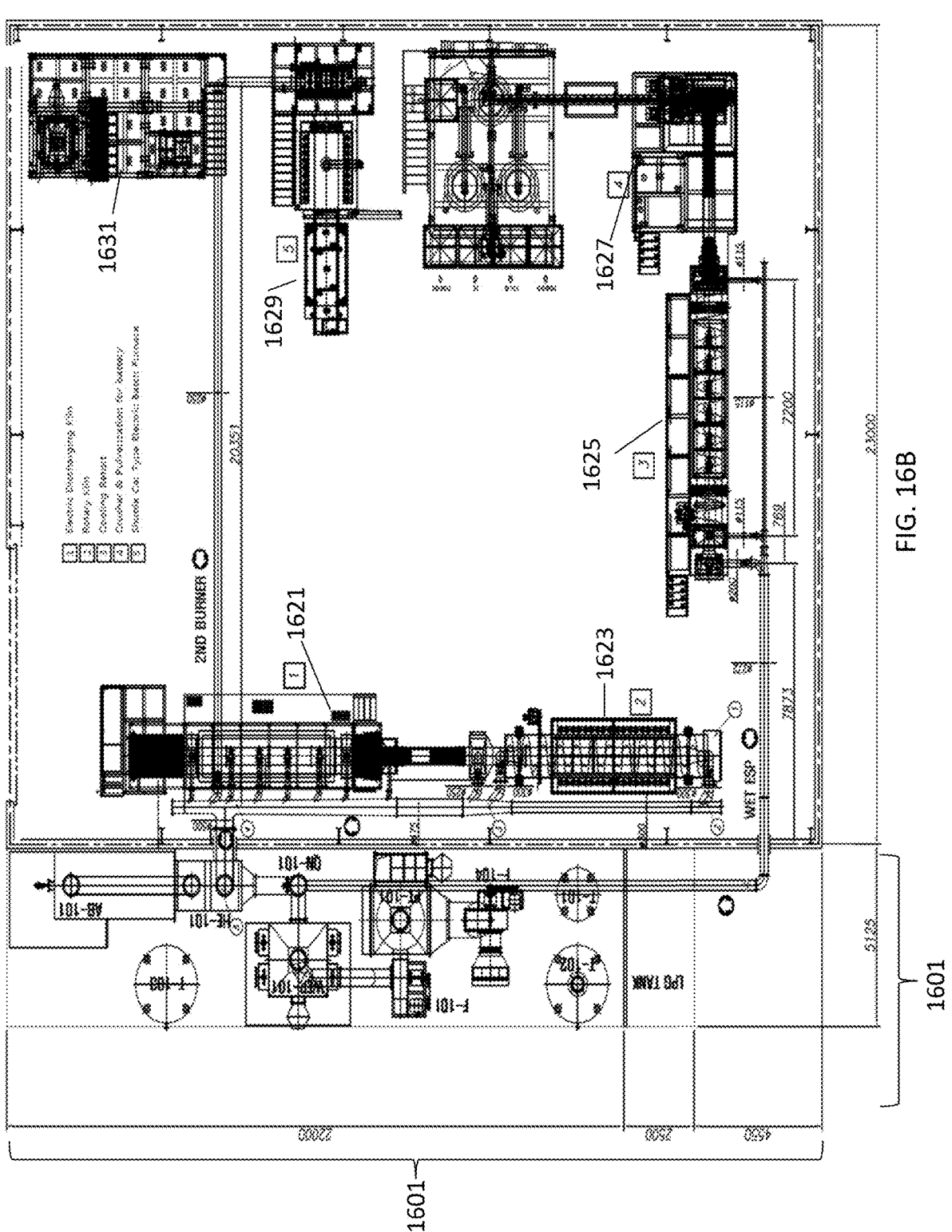

FIG. 16A is an example of a layout of a fume mitigation system 1601 of FIG. 16. Some of the components of the system 1601 include a heat exchanger 1603, wet electrostatic precipitator 1605, pre-quencher 1607; wet scrubber 1609, water condenser 1611, water treatment tank 1613, settling tank 1615, second burner 1617, and potassium oxide absorption tank 1619.

In certain examples, the process flow of an emission gas through the fume mitigation system includes: a liquid propane gas (LPG) burner, a heat exchanger, quencher, first scrubber, electrostatic dust collector, second scrubber, Heat exchanger, and then emission stack. The LPG burner burns volatile organic compounds in the emission gas. The heat exchanger reduces the gas temperature to protect the facility. Temperature ranges throughout the process include an emission gas of 450° C., burner at 800° C., gas after heat exchanger 350° C., and gas after quencher at about 60° C. The first scrubber allows mixing with KOH or NaOH to cause a precipitate F as KF and reduces the pH of the gas. The electrostatic dust collector removes the small dust particles using about 15 kilo volts of electricity. The second scrubber performs in a substantially similar manner as the first scrubber. The heat exchanger reduces the final gas temperature before the emission is released into the outside air.

FIG. 16B is example of a layout of the fume mitigation system 1601 combined with the electric discharging kiln 1621, rotary kiln 1623, cooling retort 1625, crusher and pulverization for battery 1627 and shuttle car type electric batch furnace 1629, and powder packaging machine 1631 which are discussed herein. Fumes or gas emissions from the individual machines can be delivered to the fume mitigation system 1601 by way of ventilation conduits. Table 2 below describes the outputs from processing the steps from several of the components in FIG. 16B.

Table 1 outlines a general Li-ion battery chemical composition. The metal and organic ingredients of each of the components of the battery (e.g., anode, cathode, separator and electrolyte). The cathode component contains the most metal percentage and the anode contains the largest percentage of organics.

TABLE 1

| Cathode | Metal | Li, Co, Mn, Al (as foil) | 40% |
|---|---|---|---|
|  | Organics | ① Organic binder: | <5% |
|  |  | PVDF (CH2—CF2)n |  |
|  |  | ② Conductive material |  |
|  |  | (Carbon base): |  |
|  |  | AB (Acetylene black) |  |
|  |  | ③ Solvent: NMP (N- |  |
|  |  | methylpyrrolydine) |  |
| Anode | Metal | Cu (as a foil) | 40% |
|  | Organics | ① Carbon powder |  |
|  |  | ② Organic binder: |  |
|  |  | PVDF (Polyvinylidene |  |
|  |  | fluoride) |  |
| Separator | Metal | None | <5% |
|  | Organics | Polyethylene |  |
|  |  | [—CH2CH2—]-n |  |
| Electrolyte | Lithium Salt | LiPF$_6$ | <5% |
|  | Organics | Ethylene carbonate | <5% |
|  |  | (CH2O)2CO |  |

Table 2 describes the outputs from each of the steps from the process flow of FIG. 10A. The gas output, material output and material weight loss are listed in Table 2.

TABLE 2

| Stages (from flow Chart) | Gasses | Output Materials | Weight Loss |
|---|---|---|---|
| Sorting (applies to mixed loads of batteries) | None | Non-Li-ion batteries (alkaline, NiMH, NiCd, etc. . .) Li-ion batteries | |
| Plastic Removal (applies to certain batteries with external plastic casings) | None | Plastic casings Li-ion battery cells | Plastic weight can be as high as 20% of the weight of laptop/ powertool/post consumer batteries depending on the content. |
| Discharging Kiln | Organic Material (CH2O) and Li-salt (PF3/PF5). In theory, a small amount of CO, HF and PF3/PF5 could be generated while separator and electrolyte melt and evaporate. But in testing and practice, no emissions are detected. | Discharged Li-ion battery cells | Maximum 5% of the material processed lost to gas emissions |
| Rotary Kiln and Cooling Retort | 1. Mostly carbon monoxide 2. Small amount of HF and PF3/PF5 generated while separator and electrolyte melt and evaporate. | Discharged battery cells in further degraded form (organics removed) | Maximum 10% of the material processed lost to gas emissions Weight reduced from organic burn-off is less than 15% of total weight. |
| Crushing and Pulverization | None | Black Sand (Co, Ni, Mn) Secondary Stream (Al, Cu, C, Fe) | Black sand makes up approximately 35-50% of original weight of batteries (concentration of metals depends on input source) Secondary stream makes up approximately 40% of original weight of batteries. In that mixture, the ratio of metals is approximately: Al:Cu:Fe = 1:1:0.5 |

Table 3 lists the organic material (electrolyte and binder) breakdown at the second burn-out device 1113 at a first environmental protection facility (EPF). The second burn-out device uses liquid propane gas (LPG) or liquid natural gas (LNG) burners. The electrolyte process flow produces water ($H_2O$) and carbon dioxide ($CO_2$). The binder process flow produces carbon dioxide and hydrogen fluoride (HF) which is further treated by the wet scrubber (Table 4).

TABLE 3

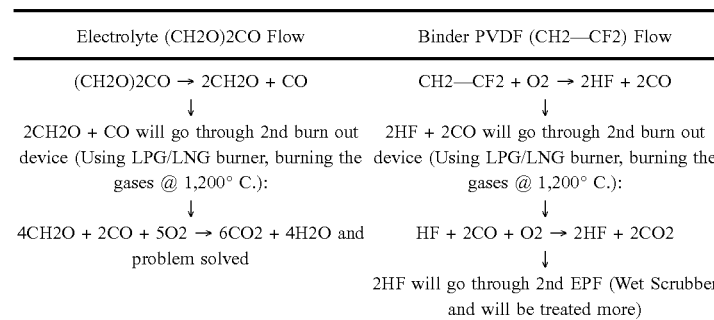

| Electrolyte (CH2O)2CO Flow | Binder PVDF (CH2—CF2) Flow |
|---|---|
| (CH2O)2CO → 2CH2O + CO ↓ 2CH2O + CO will go through 2nd burn out device (Using LPG/LNG burner, burning the gases @ 1,200° C.): ↓ 4CH2O + 2CO + 5O2 → 6CO2 + 4H2O and problem solved | CH2—CF2 + O2 → 2HF + 2CO ↓ 2HF + 2CO will go through 2nd burn out device (Using LPG/LNG burner, burning the gases @ 1,200° C.): ↓ HF + 2CO + O2 → 2HF + 2CO2 ↓ 2HF will go through 2nd EPF (Wet Scrubber and will be treated more) |

Table 4 outlines the organic material breakdown in the wet scrubber at a second environmental protection facility (EPF). The lithium salt electrolyte is neutralized in the wet scrubber and is broken down into a non-toxic calcium fluoride (CaF2). The HF generated from the binder break- down in Table 3 is reduced down to water and CaF2. The nitrous oxide gas is broken down into sodium nitrite (NaNO2) and water.

TABLE 4

Lithium salt LiPF6

LiPF6 → LiF + PF5/PH3
LiF + PF5/PH3 will go through wet scrubber (which contains NaOH and Ca(OH)2 as
neutralizer)
↓
PF5/PF3 + H2O + Ca(OH)2 or CaCO3→ CaF2 (Non-toxic). Problem solved
HF from PVDF
2HF + Ca(OH)2 → CAF2 (Non-toxic) + 2 H2O. Problem solved
NOx gas breakdown (Nitrogen from NMP solution, C5H9NO)
N of C5H9NO → converted to NOx gas
↓
NOx gas will go through wet scrubber (which
contains NaOH and Ca(OH)2 as neutralizer)
NO + NO2 + 2NaOH → 2NaOH → 2NaNO2 + H2O. Problem solved Table 5, Table 6 and Table 7 describe the gas totals generated during the electric discharge kiln and second burn-out. With the processes described herein, it is presumed that 10% of total weight is lost as gas. In certain examples, the processes described herein are expected to process 1 ton/hr generating gas of 100 kg/hr. The organic material vs. lithium salt ratio is 9:1 with organics 90 kg/hr and Li salt 10 kg/hr. The discharging kiln temperature is run at about 200° C. and the second burn out facility is run at 1000° C.

TABLE 5

Gas generated from the organic material CH2O
(CH2O) + 2CO → 2CH2O + CO
① CH2O gas out: 90000 g * 1/88 * 2 = 2045 mol CH2O ->
2045 mol * 0.08206 L · atm/mol · K * 473K = 79,375 L
② CO gas out: 90000 g * 1/88 * 1 = 1023 mol CO ->
1023 mol * 0.08206 L · atm/mol · K * 473K = 39,707 L
4CH2O + 2CO + 5O2 → 6CO2 + 4H2O
① O2 gas input: 61364 g * 1/30 * 5/4 = 2557 mol O2 -> 2557
mol * 0.08206 L · atm/mol · K * 1273K = 267,110 L
② CO2 gas out: 61364 g * 1/30 * 6/4 = 3068 mol CO2 -> 3068
mol * 0.08206 L · atm/mol · K * 1273K = 320,490 L
③ H2O gas out: 61364 g * 1/30 * 4/4 = 2045 mol H2O -> 2045
mol * 0.08206 L · atm/mol · K * 1273K = 213,625 L
Sum of Gas amount from organic material
1) From discharging kiln: 79,375 L + 39,707 L ≒
119000 L -> about 120 m³/hr
2) From 2nd burn-out facility: 320,490 L + 213,625 L ≒
534,000 L -> about 530 m³/hr + NOX

TABLE 6

LiPF6 → LiF + PF5
① LiF: Not vaporized but remains in the powder
② PF5 gas out: 10000 g * 1/152 * 1 = 66 mol
PF5 -> 66 mol * 0.08206 L · atm/mol · K *
473K = 2562 L
PF5 + H2O → PF3 + 2HF + O
① PF3 gas out: 8300 g * 1/126 * 1 = 66 mol PF3 -> 66 mol *
0.08206 L · atm/mol · K * 1273K = 6895L
② HF gas out : 8300 g * 1/126 * 2 = 132 mol HF -> 132 mol *
0.08206 L · atm/mol · K * 1273K = 13789 L

TABLE 7

Gas amount sum from Li-salt:
From discharging kiln: 2562 L -> about 2.6 m³/h
From 2nd burn out facility: 6895 L + 13789 L ≒ 20684L -> about 21 m³/hr
Total Gas amount from Discharging process:
1) Electric discharging kiln: from organic 120 m³ +
from li-salt 2.6 m³ = about 123 m³/hr

TABLE 7-continued

2) Burn-Out facility: from organic 530 m³ + lithium-salt 21 m³ +
NOx = about 550 m³/hr + NOx In Table 8, the gas generated by the electric discharging kiln and second burn-out device is described below in Table 8. It is expected that the process will lose 10% of total weight as gas. It is expected to process 1 ton/hr generating gas 100 kg/hr. Organic material vs. lithium salt ratio=9: 1→organics 90 kg/hr, Li-salt 10 kg/hr. N-Methyl-2-pyrroli- done (NMP), a solvent, amount is too small and disregarded. Rotary kiln temperature is run at about 300-500° C. The second burn-out facility is run at a temperature of about 1000° C.

The total emissions generated a total of 123 m³/hr+550 m³/hr (from discharging process)+400 m³/hr+650 m³/hr (from rotary kiln process)=1,723 m³/hr gas, but the gas is neither harmful nor toxic. Additionally, no waste-water is generated.

TABLE 8

Figure 17:
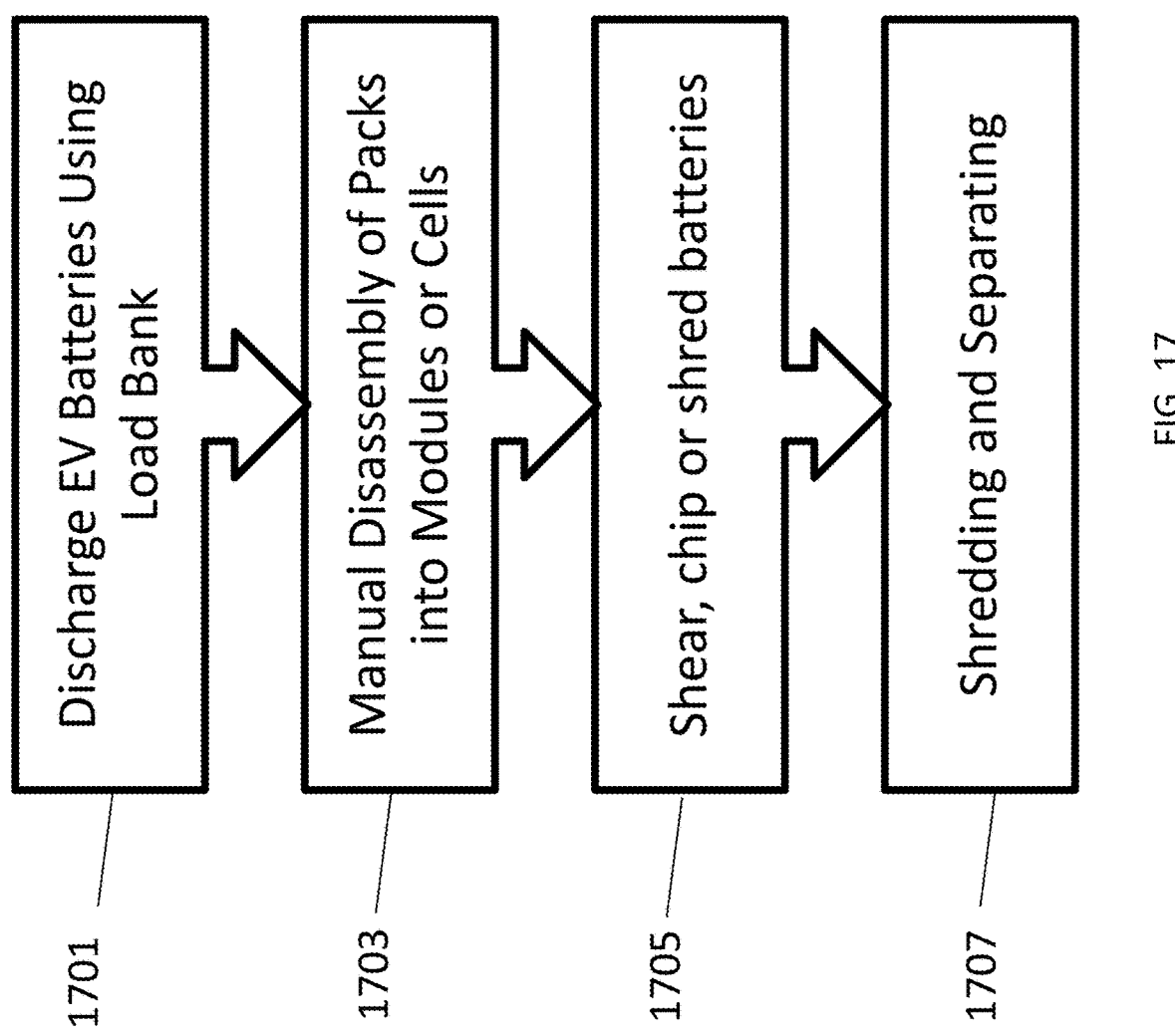
FIG. 17 is a flowchart of a process for providing an integrated recycling complex to discharge and process EV Li-ion batteries, according to another embodiment.
Figure 18:
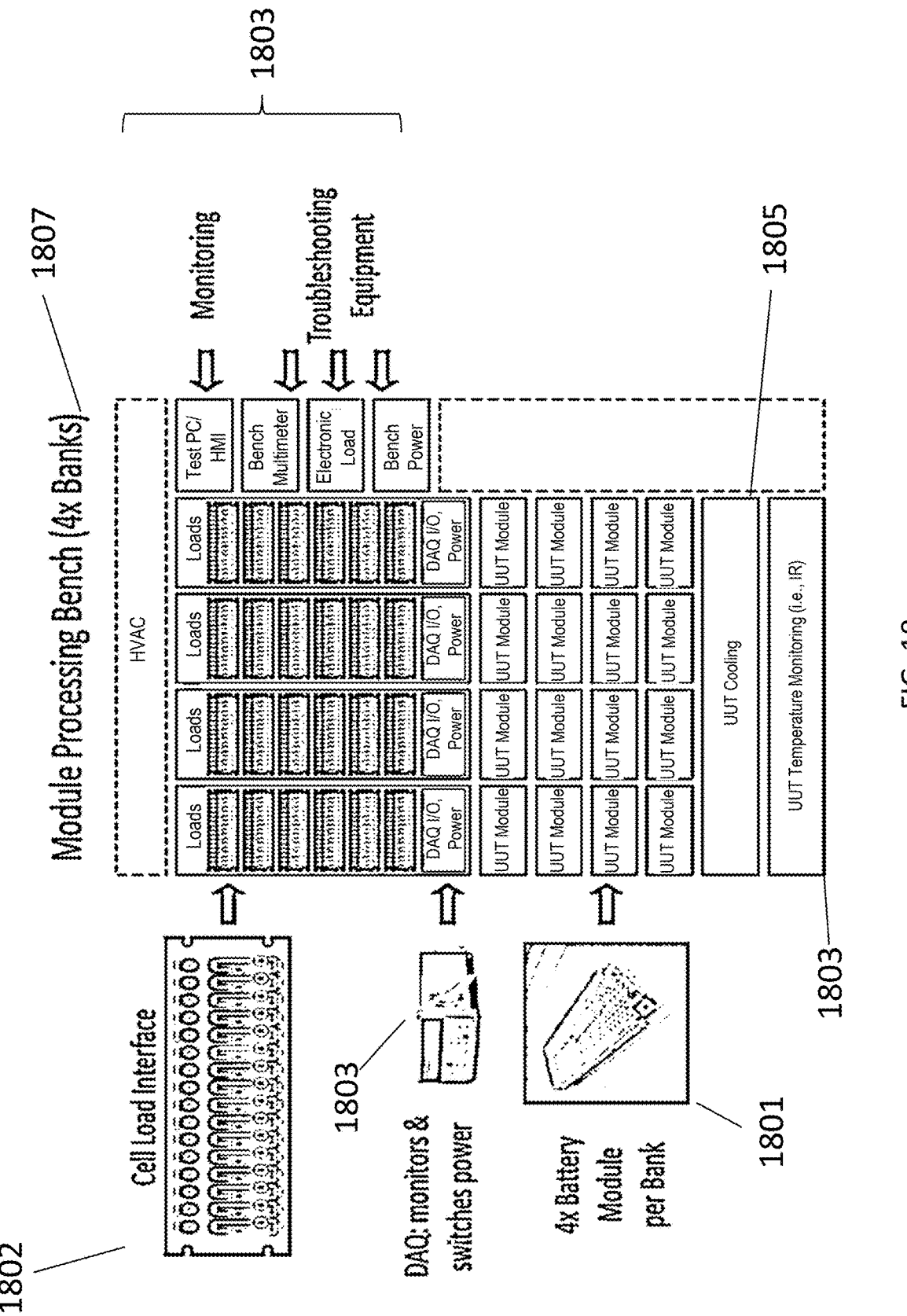
FIG. 18 is a diagram illustrating the process of discharging EV Li-ion batteries of FIG. 17, according to one embodiment.

CH2—CF2 + O2→ 2HF + 2CO
① HF gas out: 100000 g * 1/64 * 2 = 3125 mol HF → 3125 mol *
0.08206 L · atm/mol · K * 773K = 198,226 L
② CO gas out : 100000 g * 1/64 * 2 = 3125 mol CO → 3125 mol *
0.08206 L · atm/mol · K * 773K = 198,226 L
2HF + 2CO + O2 → 2HF + 2CO2
① O2 gas input: 62500 g * 1/20 * 1/2 = 1563 mol O2 → 1563 mol *
0.08206 L · atm/mol · K * 1273K = 163,275 L
② HF gas out: 62500 g * 1/20 * 2/2 = 3125 mol HF → 3125 mol *
0.08206 L · atm/mol · K * 1273K = 326,445 L
③ CO2 gas out: 62500 g * 1/20 * 2/2 = 3125 mol CO2 → 3125 mol *
0.08206 L · atm/mol · K * 1273K = 326,445 L
Total Gas amount from Rotary Kiln process
1) From rotary kiln: 198,226 L + 198,226 L ≒ 396000 L ->
about 400 m³/hr
2) From second burn-out facility: 326,445 L + 326,445 L ≒
653000 L -> about 650 m³/hr + NOx FIG. 17 is a flowchart of another process for providing an integrated recycling complex to discharge and process EV Li-ion batteries. In FIG. 17, the discharging of EV batteries using a load bank 1701 is performed. FIG. 18 is a diagram illustrating the process of discharging EV Li-ion batteries of FIG. 17 with a load bank. A battery cell is the smallest, packaged form a battery can take on, and a module includes several cells generally connected in either series or parallel.

The EV battery modules 1801 are placed on a bench using resistors as load banks and an inline fuse to discharge the batteries by module or cell to a low voltage. A load bank is a device including load interfaces 1802 which develops an electrical load, applies the load to an electrical power source, such as a 4× EV battery module 1801, and converts or dissipates the resultant power output of the source. A load bank includes load elements 1803 with protection, control, metering, troubleshooting and accessory devices required for operation. The load of a resistive load bank is created by the conversion of electrical energy to heat via high-power resistors such as grid resistors. This heat must be dissipated from the load bank, either by unit under test (UUT) cooling 1805 such as air or by water, by forced means or convection. Heating, ventilation, and air conditioning (HVAC) 1807 is provided for maintaining temperature control of the module processing bench.

Figure 19:
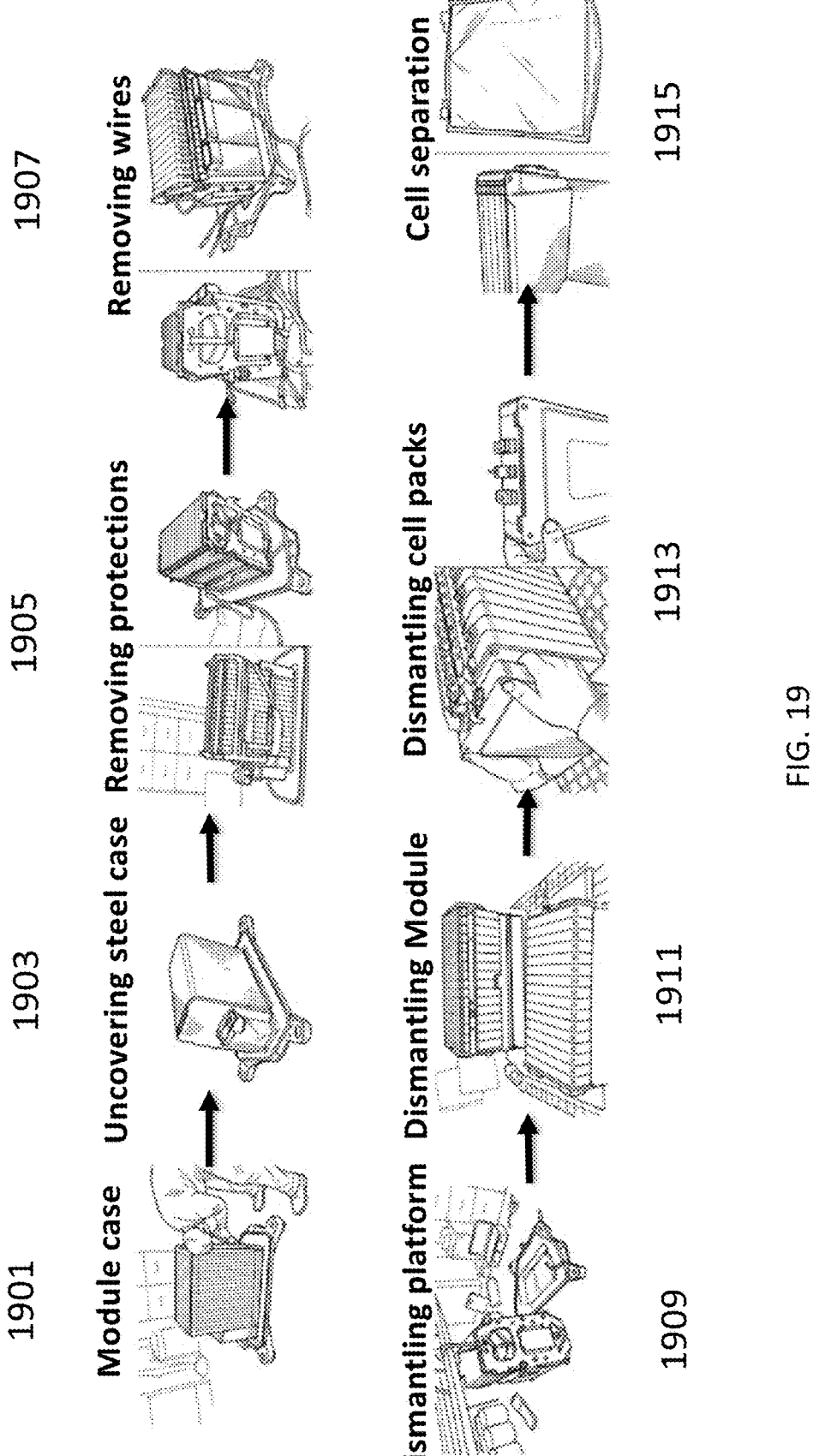
FIG. 19 is a diagram illustrating the manual disassembly process of FIG. 17, according to one embodiment.

Step 1703 in FIG. 17 is the process flow for the manual disassembly of previously discharged packs into modules or cells. FIG. 19 describes the disassembly of a module. A module case is provided 1901 and a steel or metal case is uncovered 1903. Protections are removed 1905 as well as wiring 1907. A dismantling platform is provided 1909 to support the battery module during dismantling 1911. Cell packs are dismantled 1913 and cells are separated 1915.

Figure 20:
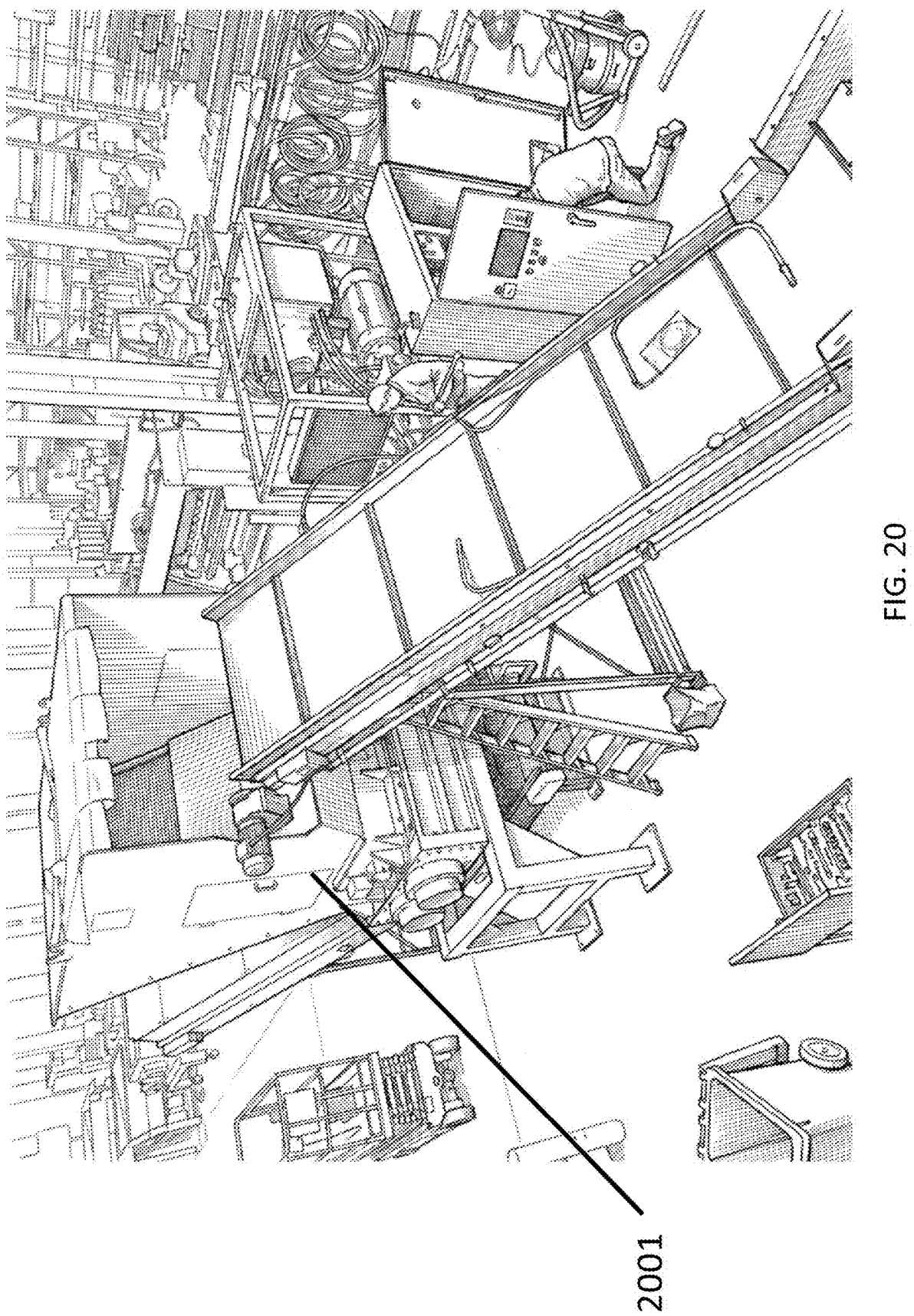
FIG. 20 is an illustration of hardware for the shearing, chipping or shredding process of FIG. 17, according to one embodiment.

FIG. 20 is an example of a dual shaft shear shredder 2001 hardware for shearing, chipping or shredding of batteries 1705 (FIG. 17). The shredder 2001 uses hydraulic power with high torque and low shaft speed counter rotating cutter disks. The shredder 2001 is configured to reduce the size of the cells or modules into smaller pieces or chunks. Sizes of the pieces can be adjusted, but pieces of approximately 3"×3" are ideal for next stage shredding and separating steps 1707. The shredding and separating station is substantially the same as described above for step 109 in FIG. 1 and FIG. 8.

Figure 21:
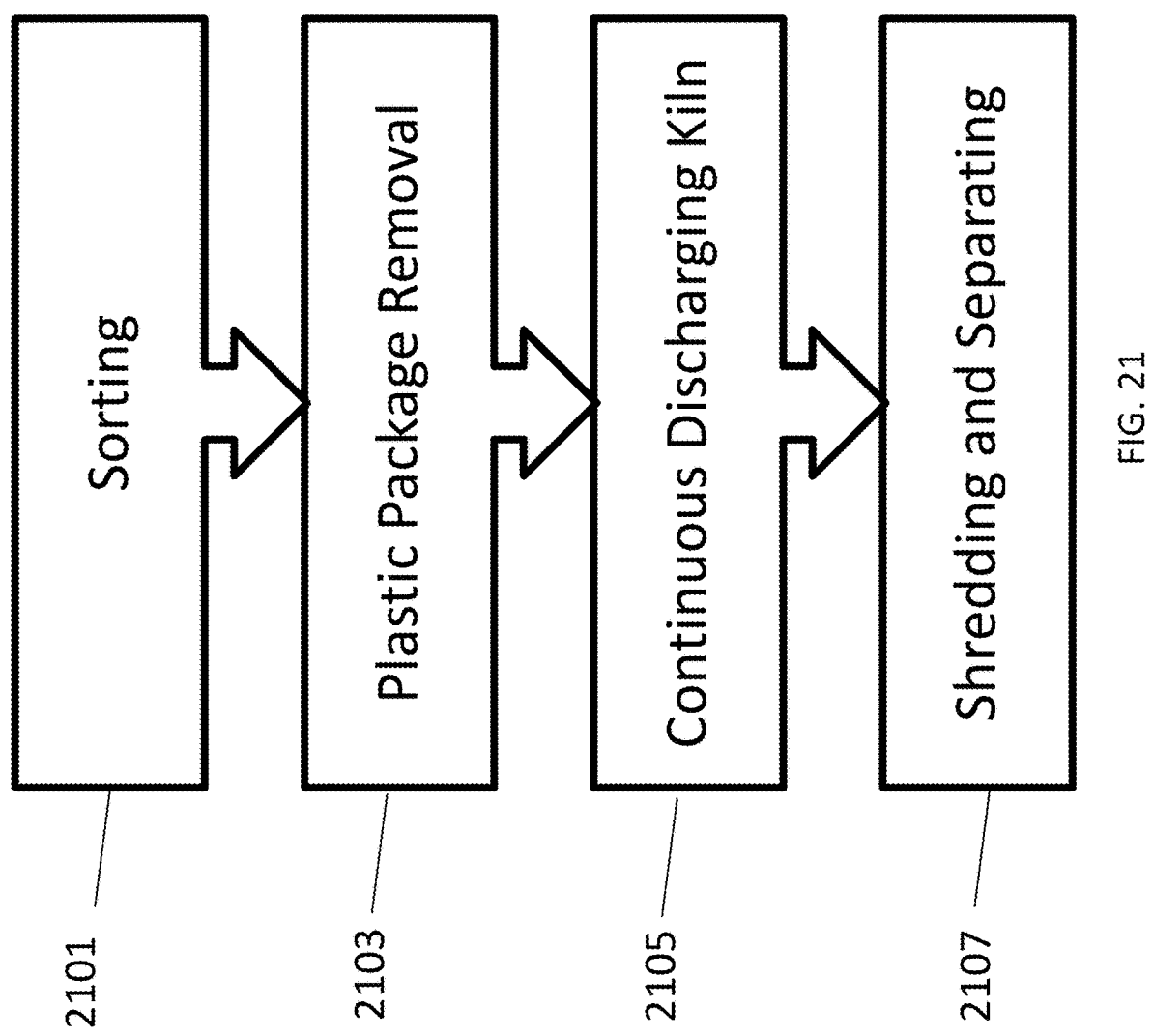
FIG. 21 is a flowchart of a process for providing an integrated recycling complex to discharge and process Li-ion batteries, according to yet another embodiment.

FIG. 21 is a flowchart of another process for providing an integrated recycling complex to discharge and process Li-ion batteries. The sorting step 2101, plastic package removal 2103 and shredding and separating step 2107 are substantially the same steps as discussed above with respect to FIG. 1 and are not repeated here. The continuous discharging kiln step 2105 is a direct burning apparatus that uses gas.

Figure 22A:
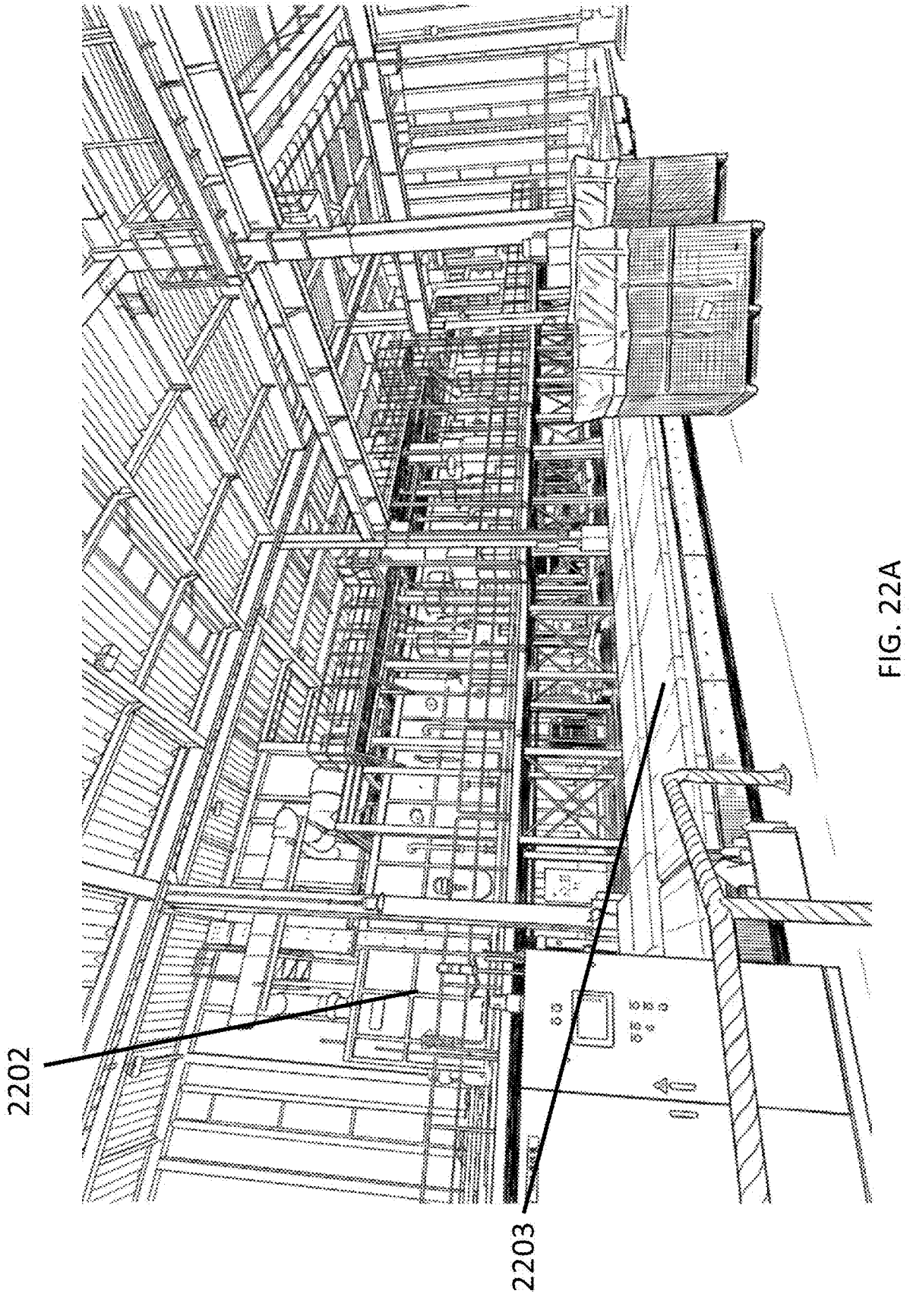
FIG. 22A is an illustration of a continuous discharging kiln for the continuous discharging process of FIG. 21, according to one embodiment.

FIG. 22A is an example of a continuous discharging kiln 2202 with a shuttle car rail system 2203 that is provided for transport of the batteries. An elevator is provided for transporting the batteries into the continuous discharging kiln 2202. The continuous discharging kiln operates at 300 to 400° C. and the shuttle car rail system 2203 operates from one end of the kiln to the other. The continuous discharging kiln 2202 significantly reduces processing times at approximately a quarter of current time. This process adds value to the material as to the high concentration of precious metals.

Figure 22B:
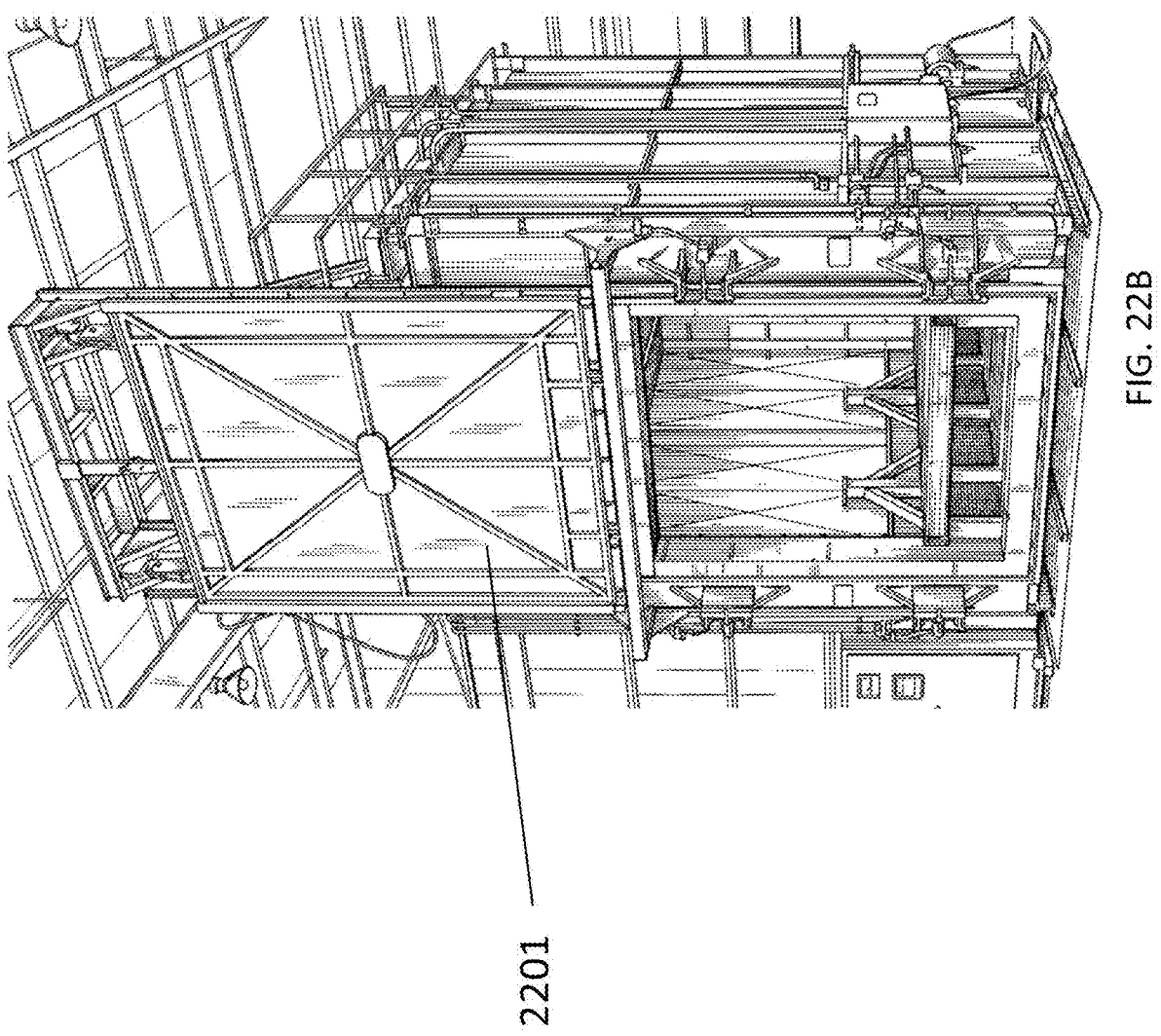
FIG. 22B is an illustration of alternative hardware for the discharging process of FIG. 21, according to one embodiment.

The batch furnace 2201 of FIG. 22B is another example of hardware configured to discharge the battery cells or modules. Batteries are placed in the batch furnace 2201 at approximately 300° C. Other temperature ranges can be used if the temperature and time are sufficient to dry the electrolyte contained in the cell to effectively discharge the batteries. In this example, entire EV modules can be discharged batch furnace 2201 without manual disassembly, thereby reducing manual labor and improving processing efficiency. The process flow of FIG. 21A significantly reduces processing times. It takes only a quarter of the current time. This process adds value to the material as a high concentration of precious metals can be retrieved.

Batch furnace 2201 (FIG. 22B) is configured for electrode powder scrap calcination. It can have a capacity of 0.75 ton/1 batch. The operating temperature for calcination is about 500-650° C. for approximately 4-5 hours. The batch furnace 2201 is an overall steel structure that includes a shuttle car and hinge type door. A burn-out facility, ceramic insulation, heater (e.g., radiant tube type heater), ventilation and user control panel are also provided. The shuttle car transports the material through the batch furnace 2201. The batch furnace is ideal since it can handle a large volume of material. Processing steps can be reduced with a batch furnace since it can load EV size batteries without first dismantling or discharging and without risk of explosion.

The embodiments of the present disclosure can achieve several technical effects including production of "black sand" which is an end product having a high concentration of metals which is ideal for further processing by second stage processors, or other materials technology and recycling processors. Embodiments of the present disclosure enjoy utility in various recycling or materials applications. The present disclosure therefore enjoys industrial applicability in various types of battery recycling facilities which can isolate valuable metals, including lithium, and prevent such metals from ending up at landfills as hazardous and toxic materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A battery processing system comprising:

a sorter configured to sort a mixed chemistry of batteries comprising lithium ion (Li-ion) batteries and one or more of alkaline, nickel metal hydride (Ni-MH) and nickel cadmium (Ni—Cd) batteries, such that the Li-ion batteries are separated from the one or more of alkaline, Ni-MH and Ni—Cd batteries into bins;

a packaging removal device configured to remove packaging from the Li-ion batteries to expose Li-ion cells of the Li-ion batteries;

a puncturing device configured to puncture the Li-ion cells before discharging, wherein the puncturing allows electrolyte in the punctured Li-ion cells to dry out to increase a speed of electrolyte evaporation and decrease a Li-ion processing time of the battery processing;

a conveyor configured to deposit the punctured Li-ion cells in water for fire or fume mitigation;

a kiln or salt bath configured to discharge the punctured Li-ion cells;

a cooling retort configured to cool the discharged and punctured Li-ion cells;

a shredder configured to shred the cooled, discharged, and punctured Li-ion cells into pieces;

a magnetic separator configured to remove iron (Fe) from the shredded pieces; and a pulverizer configured to pulverize remaining shredded pieces of the pieces into a mixed powder including Li and at least one powder selected from the group consisting of cobalt (Co), nickel (Ni), manganese (Mn) and carbon (C).

2. The battery processing system of claim 1, further comprising an air separator configured to separate aluminum (Al) and copper (Cu) from the mixed powder.

3. The battery processing system of claim 1, wherein the salt bath comprises an aqueous solution of sodium chloride (NaCl), sodium sulfate (NaSO$_4$), iron sulfate (FeSO$_4$) or zinc sulfate (ZnSO$_4$) for discharging the Li-ion cells.

4. The battery processing system of claim 1, further comprising a rotary kiln downstream of the discharging kiln to reduce the Li-ion cells down to a calcined metal product to be shredded.

5. The battery processing system of claim 1, further comprising a fume mitigation system comprising one or more of a liquid propane gas (LPG) burner, a heat exchanger, quencher, one or more scrubbers, electrostatic dust collector, and emission stack.

6. An integrated recycling system for processing electric vehicle (EV) modules, the system comprising: a puncturing device configured to puncture the EV modules before discharging, wherein the puncturing allows electrolyte in the punctured EV modules to dry out to increase affects a speed of electrolyte evaporation and decrease a Li-ion processing time; a conveyor configured to deposit the punctured EV modules in water for fire or fume mitigation; a kiln configured to discharge the punctured EV module by heating; a cooling retort configured to cool the discharged and punctured EV modules; a shredder shredding the discharged EV modules into pieces; a magnetic separator for separating metal-containing interior cells from plastic remains; and a pulverizer for pulverizing the metal-containing interior cells into a mixed metal powder.

7. The integrated recycling system of claim 6, further comprising a fume mitigation system comprising one or more of a liquid propane gas (LPG) burner, a heat exchanger, quencher, one or more scrubbers, electrostatic dust collector, and emission stack.

8. The integrated recycling system of claim 6, wherein the mixed metal powder comprises lithium (Li) and at least one of cobalt (Co), nickel (Ni) and manganese (Mn).

9. The integrated recycling system of claim 6, further comprising a dismantling station configured to dismantle cell packs and separating of cells from the EV module.

10. The integrated recycling system of claim 6, wherein the shredder comprises a hydraulic dual shaft shredder.

11. The integrated recycling system of claim 6, wherein the discharging kiln comprises a continuous direct gas burning device.

* * * * *